(12) United States Patent
Philyaw

(10) Patent No.: US 7,308,483 B2
(45) Date of Patent: *Dec. 11, 2007

(54) METHOD AND APPARATUS FOR AUTOMATIC CONFIGURATION OF EQUIPMENT

(75) Inventor: Jeffry Jovan Philyaw, Dallas, TX (US)

(73) Assignee: LV Partners, L.P., Dallas, TX (US)

( * ) Notice: Subject to any disclaimer, the term of this patent is extended or adjusted under 35 U.S.C. 154(b) by 541 days.

This patent is subject to a terminal disclaimer.

(21) Appl. No.: 10/828,037

(22) Filed: Apr. 20, 2004

(65) Prior Publication Data

US 2004/0199615 A1    Oct. 7, 2004

Related U.S. Application Data

(63) Continuation of application No. 09/568,148, filed on May 10, 2000, now Pat. No. 6,725,260, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, and a continuation-in-part of application No. 09/151,530, filed on Sep. 11, 1998, now Pat. No. 6,098,106.

(51) Int. Cl.
*G06F 15/16* (2006.01)
(52) U.S. Cl. ...................... 709/217; 709/218
(58) Field of Classification Search ................ 709/220; 710/10; 717/168–178
See application file for complete search history.

(56) References Cited

U.S. PATENT DOCUMENTS

| | | | |
|---|---|---|---|
| 3,668,312 A | 6/1972 | Yamamoto et al. | |
| 4,002,886 A | 1/1977 | Sundelin | |
| 4,042,792 A | 8/1977 | Pakenham et al. | |
| 4,365,148 A | 12/1982 | Whitney | |
| 4,621,259 A | 11/1986 | Schepers et al. | |
| 4,654,482 A | 3/1987 | DeAngelis | |
| 4,780,599 A | 10/1988 | Baus | |

(Continued)

FOREIGN PATENT DOCUMENTS

| | | |
|---|---|---|
| EP | 0 961 250 A2 | 12/1999 |
| JP | 10188140 A | 12/1996 |
| WO | WO 95/10813 | 10/1994 |
| WO | WO 96/07146 | 9/1995 |
| WO | WO 97/37319 | 2/1997 |

(Continued)

OTHER PUBLICATIONS

"Group Decision Support System; Development and Application", Energy Systems, James W. Thomas; Westinghouse, Pittsburgh, PA.

(Continued)

*Primary Examiner*—Krisna Lim
(74) *Attorney, Agent, or Firm*—Howison & Arnott, L.L.P.

(57) ABSTRACT

An architecture for automatically configuring equipment. A piece of equipment connected externally to a user PC has one or more machine-resolvable codes (MRCs) associated therewith. The piece of equipment receives configuration information from a remote location disposed on the network in response to reading a select one of the one or more MRCs with a reader. Configuration information associated with the select one of the one or more MRCs is transmitted from the remote location to the piece of equipment via the user PC, and the piece of equipment is then configured according to the configuration information.

20 Claims, 20 Drawing Sheets

U.S. PATENT DOCUMENTS

| | | |
|---|---|---|
| 4,785,296 A | 11/1988 | Tabata et al. |
| 4,816,904 A | 3/1989 | McKenna et al. |
| 4,817,136 A | 3/1989 | Rhoads |
| 4,833,308 A | 5/1989 | Humble |
| 4,841,132 A | 6/1989 | Kajitani et al. |
| 4,845,634 A | 7/1989 | Vitek et al. |
| 4,894,789 A | 1/1990 | Yee |
| 4,899,370 A | 2/1990 | Kameo et al. |
| 4,901,073 A | 2/1990 | Kibrick |
| 4,905,094 A | 2/1990 | Pocock et al. |
| 4,907,264 A | 3/1990 | Seiler et al. |
| 4,916,293 A | 4/1990 | Cartledge et al. |
| 4,937,853 A | 6/1990 | Brule et al. |
| 4,947,028 A | 8/1990 | Gorog |
| 4,959,530 A | 9/1990 | O'Connor |
| 4,975,948 A | 12/1990 | Andersen et al. |
| 4,984,155 A | 1/1991 | Geier et al. |
| 5,038,023 A | 8/1991 | Saliga |
| 5,054,096 A | 10/1991 | Beizer |
| 5,088,045 A | 2/1992 | Shimanaka et al. |
| 5,111,391 A | 5/1992 | Fields et al. |
| 5,115,326 A | 5/1992 | Burgess et al. |
| 5,128,752 A | 7/1992 | Von Kohorn |
| 5,144,654 A | 9/1992 | Kelley et al. |
| 5,161,037 A | 11/1992 | Saito |
| 5,161,214 A | 11/1992 | Addink et al. |
| 5,182,705 A | 1/1993 | Barr et al. |
| 5,189,630 A | 2/1993 | Barstow et al. |
| 5,191,525 A | 3/1993 | LeBrun et al. |
| 5,198,644 A | 3/1993 | Pfeiffer et al. |
| 5,235,654 A | 8/1993 | Anderson et al. |
| 5,241,402 A | 8/1993 | Aboujaoude et al. |
| 5,243,531 A | 9/1993 | DiPippo et al. |
| 5,247,347 A | 9/1993 | Litteral et al. |
| 5,262,860 A | 11/1993 | Fitzpatrick et al. |
| 5,285,278 A | 2/1994 | Holman |
| 5,287,181 A | 2/1994 | Holman |
| 5,288,976 A | 2/1994 | Citron et al. |
| 5,296,688 A | 3/1994 | Hamilton et al. |
| 5,304,786 A | 4/1994 | Pavlidis et al. |
| 5,305,195 A | 4/1994 | Murphy |
| 5,319,454 A | 6/1994 | Schtte |
| 5,324,922 A | 6/1994 | Roberts |
| 5,331,547 A | 7/1994 | Laszlo |
| 5,340,966 A | 8/1994 | Morimoto |
| 5,357,276 A | 10/1994 | Banker et al. |
| 5,362,948 A | 11/1994 | Morimoto |
| 5,382,779 A | 1/1995 | Gupta |
| 5,386,298 A | 1/1995 | Bronnenberg et al. |
| 5,398,336 A | 3/1995 | Tantry et al. |
| 5,405,232 A | 4/1995 | Lloyd et al. |
| 5,418,713 A | 5/1995 | Allen |
| 5,420,403 A | 5/1995 | Allum et al. |
| 5,420,943 A | 5/1995 | Mak |
| 5,424,524 A | 6/1995 | Ruppert et al. |
| 5,438,355 A | 8/1995 | Palmer |
| 5,446,490 A | 8/1995 | Blahut et al. |
| 5,446,919 A | 8/1995 | Wilkins |
| 5,483,640 A | 1/1996 | Isfeld et al. |
| 5,491,508 A | 2/1996 | Friedell et al. |
| 5,493,107 A | 2/1996 | Gupta et al. |
| 5,519,878 A | 5/1996 | Dolin, Jr. |
| 5,530,852 A | 6/1996 | Meske, Jr. et al. |
| 5,570,295 A | 10/1996 | Isenberg et al. |
| 5,572,643 A | 11/1996 | Judson |
| 5,592,551 A | 1/1997 | Lett et al. |
| 5,594,226 A | 1/1997 | Steger |
| 5,602,377 A | 2/1997 | Beller et al. |
| 5,604,542 A | 2/1997 | Dedrick |
| 5,640,193 A | 6/1997 | Wellner |
| 5,649,186 A | 7/1997 | Ferguson |
| 5,664,110 A | 9/1997 | Green et al. |
| 5,671,282 A | 9/1997 | Wolff et al. |
| 5,675,721 A | 10/1997 | Freedman et al. |
| 5,682,540 A | 10/1997 | Klotz, Jr. et al. |
| 5,694,163 A | 12/1997 | Harrsion |
| 5,708,780 A | 1/1998 | Levergood et al. |
| 5,710,887 A | 1/1998 | Chelliah et al. |
| 5,715,314 A | 2/1998 | Payne et al. |
| 5,724,424 A | 3/1998 | Gifford |
| 5,745,681 A | 4/1998 | Levine et al. |
| 5,754,906 A | 5/1998 | Yoshida |
| 5,757,917 A | 5/1998 | Rose et al. |
| 5,761,606 A | 6/1998 | Wolzien |
| 5,764,906 A | 6/1998 | Edelstein et al. |
| 5,765,176 A | 6/1998 | Bloomberg |
| 5,768,528 A | 6/1998 | Stumm |
| 5,768,583 A | 6/1998 | Orzol et al. |
| 5,774,664 A | 6/1998 | Hidary et al. |
| 5,774,870 A | 6/1998 | Storey |
| 5,778,367 A | 7/1998 | Wesinger, Jr. et al. |
| 5,787,246 A | 7/1998 | Lichtman et al. |
| 5,790,793 A | 8/1998 | Highley |
| 5,791,991 A | 8/1998 | Small |
| 5,794,210 A | 8/1998 | Goldhaber et al. |
| 5,796,952 A | 8/1998 | Davis et al. |
| 5,804,803 A | 9/1998 | Cragun et al. |
| 5,812,776 A | 9/1998 | Gifford |
| 5,815,776 A | 9/1998 | Nukada |
| 5,832,223 A | 11/1998 | Hara et al. |
| 5,833,468 A | 11/1998 | Guy et al. |
| 5,848,202 A | 12/1998 | D'Eri et al. |
| 5,848,413 A | 12/1998 | Wolff |
| 5,854,897 A | 12/1998 | Radziewicz et al. |
| 5,864,823 A | 1/1999 | Levitan |
| 5,867,730 A | 2/1999 | Leyda |
| 5,869,819 A | 2/1999 | Knowles et al. |
| 5,905,248 A | 5/1999 | Russell et al. |
| 5,905,251 A | 5/1999 | Knowles |
| 5,905,665 A | 5/1999 | Rim |
| 5,905,865 A | 5/1999 | Palmer et al. |
| 5,907,793 A | 5/1999 | Reams |
| 5,913,210 A | 6/1999 | Call |
| 5,915,090 A | 6/1999 | Joseph et al. |
| 5,918,214 A | 6/1999 | Perkowski |
| 5,925,865 A | 7/1999 | Steger |
| 5,929,850 A | 7/1999 | Broadwin et al. |
| 5,932,863 A | 8/1999 | Rathus et al. |
| 5,933,829 A | 8/1999 | Durst et al. |
| 5,948,061 A | 9/1999 | Merriman et al. |
| 5,957,695 A | 9/1999 | Redford et al. |
| 5,960,411 A | 9/1999 | Hartman et al. |
| 5,961,603 A | 10/1999 | Kunkel et al. |
| 5,970,471 A | 10/1999 | Hill |
| 5,970,472 A | 10/1999 | Allsop et al. |
| 5,971,277 A | 10/1999 | Cragum et al. |
| 5,974,443 A | 10/1999 | Jeske |
| 5,974,451 A | 10/1999 | Simmons |
| 5,976,833 A | 11/1999 | Furukawa et al. |
| 5,978,773 A | 11/1999 | Hudetz et al. |
| 5,991,739 A | 11/1999 | Cupps et al. |
| 5,992,752 A | 11/1999 | Wilz, Sr. et al. |
| 5,995,105 A | 11/1999 | Reber et al. |
| 6,002,394 A | 12/1999 | Schein et al. |
| 6,003,073 A | 12/1999 | Solvason |
| 6,006,257 A | 12/1999 | Slezak |
| 6,009,410 A | 12/1999 | LeMole et al. |
| 6,009,465 A | 12/1999 | Decker et al. |
| 6,012,102 A | 1/2000 | Shachar |
| 6,018,764 A | 1/2000 | Field et al. |
| 6,049,870 A | 4/2000 | Greaves |
| 6,064,979 A | 5/2000 | Perkowski |
| 6,098,106 A | 8/2000 | Philyaw |
| 6,108,656 A | 8/2000 | Durst et al. |

| | | | |
|---|---|---|---|
| 6,134,616 | A | 10/2000 | Beatty |
| 6,167,567 | A | 12/2000 | Chiles et al. |
| 6,177,860 | B1 | 1/2001 | Cromer et al. |
| 6,189,050 | B1 | 2/2001 | Sakarda |
| 6,247,128 | B1 | 6/2001 | Fisher et al. |
| 6,256,732 | B1 | 7/2001 | Cromer et al. |
| 6,301,012 | B1 | 10/2001 | White et al. |
| 6,301,612 | B1 | 10/2001 | Selitrennikoff et al. |
| 6,311,165 | B1 | 10/2001 | Coutts et al. |
| 6,336,152 | B1 | 1/2002 | Richman et al. |
| 6,418,555 | B2 | 7/2002 | Mohammed |
| 6,460,093 | B1 | 10/2002 | Taugher |
| 6,490,637 | B1 | 12/2002 | Shih |
| 6,493,770 | B1 | 12/2002 | Sartore et al. |
| 6,496,858 | B1 | 12/2002 | Frailong et al. |
| 6,725,260 | B1 | 4/2004 | Philyaw |
| 6,745,234 | B1 | 6/2004 | Philyaw et al. |

FOREIGN PATENT DOCUMENTS

| | | |
|---|---|---|
| WO | WO 98/09243 | 8/1997 |
| WO | WO 98/03923 | 1/1998 |
| WO | WO 98/06055 | 2/1998 |
| WO | WO 98/19259 | 5/1998 |
| WO | WO 98/40823 | 9/1998 |
| WO | WO 99/63457 | 6/1999 |

OTHER PUBLICATIONS

"New Technologies in Credit Card Authentication", Pieter de Bruyne; Institute for Communications TechnologyZurich, Switzerland; CH2892-1990 IEEE.

"AVITAL, A Private Teaching System by Fax Communication", Atsushi Iizawa et al.; Software Research Center, RICOH Company; 8186-2697; Jun. 1992; IEEE.

"Document on Computer" IPCC96; Fast Track; The US Postal Service . . . ; 7803-3689, 1996, IEEE.

"Development of a Commercially Successful Wearable Data Collection System" Robert Stein et al.; 8186-9074; Jul. 1998, IEEE.

"NESTLE, What Do Forward Looking Companies Consider in Their Plans and Developments?" A. G. Johnston; File Name: IEE Colloquium; Oct. 12, 1997.

"The Automation Synergy", Ricardo Neves et al.; IEEE Catalog No. 97TH8280.

"Integration of Hand-Written Address Interpretation Technology Into the United States Postal Service Remote Computer Reader System"; Sargur N. Srihari et al. 8186-7898; Apr. 1997; IEEE.

"Paper Based Document Security—A Review" Rudolf L. Van Renesse; European Conference on Security and Detection Apr. 28-30, 1997; Publication No. 437; IEE 1997.

"IEEE Standard for Bar Coding for Distribution Transformers", IEEE Std. C57, 1996; Copyright 1996 by the Institute of Electrical and Electrinics Engineers, Inc.

"The Stylus" Shopping from Home; John W. Barrus et al.; Stylus Innovation, Cambridge, MA 02142; 8186-2730; IEEE, 1992.

"Distributing Uniform Resource Locators as Bar Code Images"; IBM Technical Disclosure Bullettin . . . , Jan. 1996; vol. 39; Pub. No. 1; pp. 167-168.

"Bar Code Method for Automating Catalog Orders"; IBM Technical Disclosure Bulletin, pp. 243-244; Sep. 1988.

"Bar Code Recognition System Using Image Processing"; Miko Kuroki et al.; Hitachi Process Computer Engineering, Inc.

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

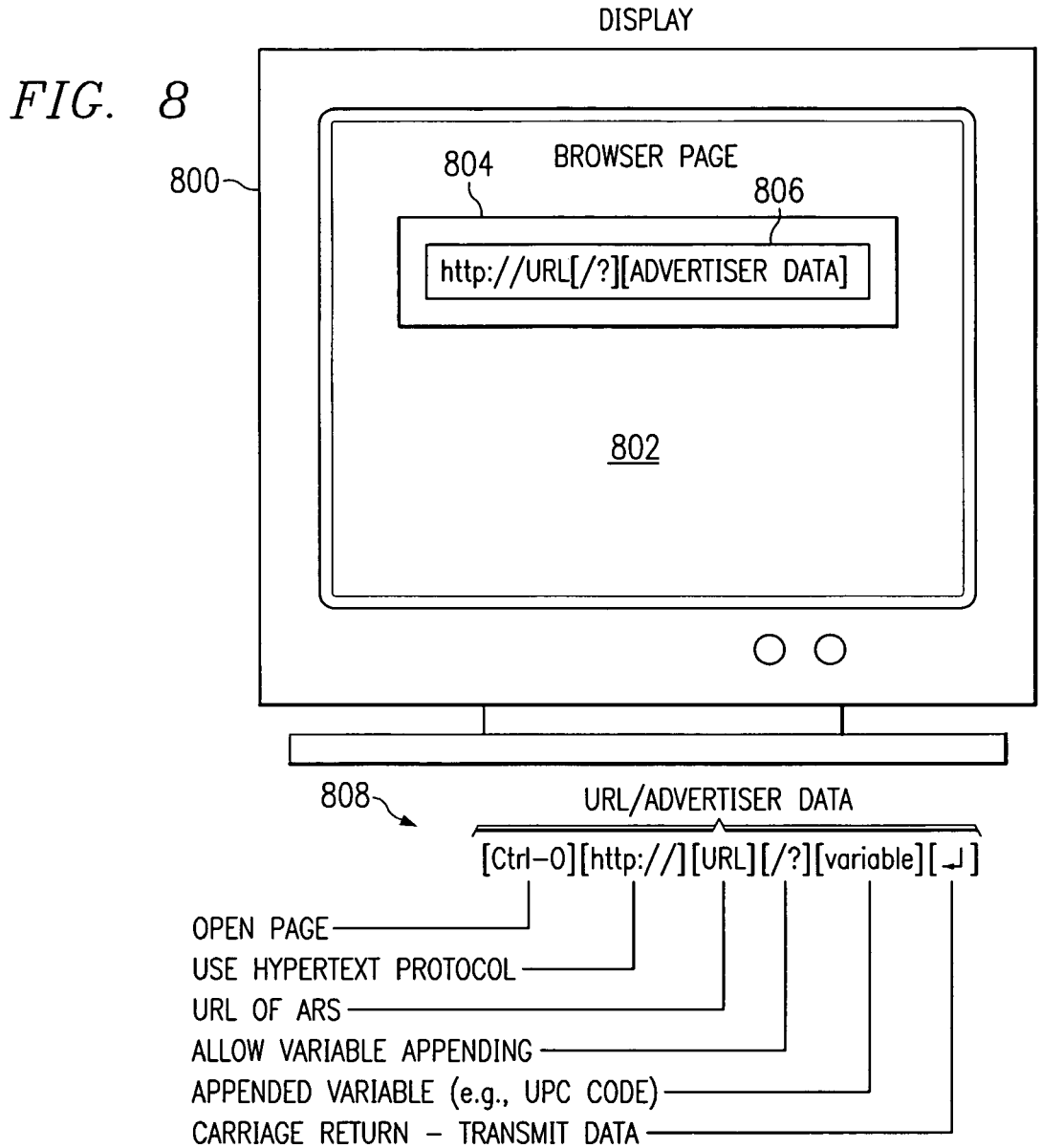
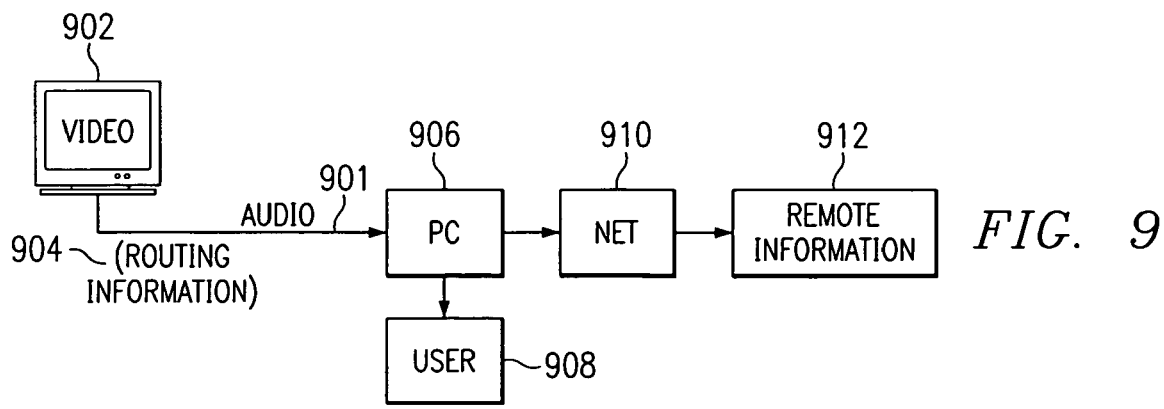

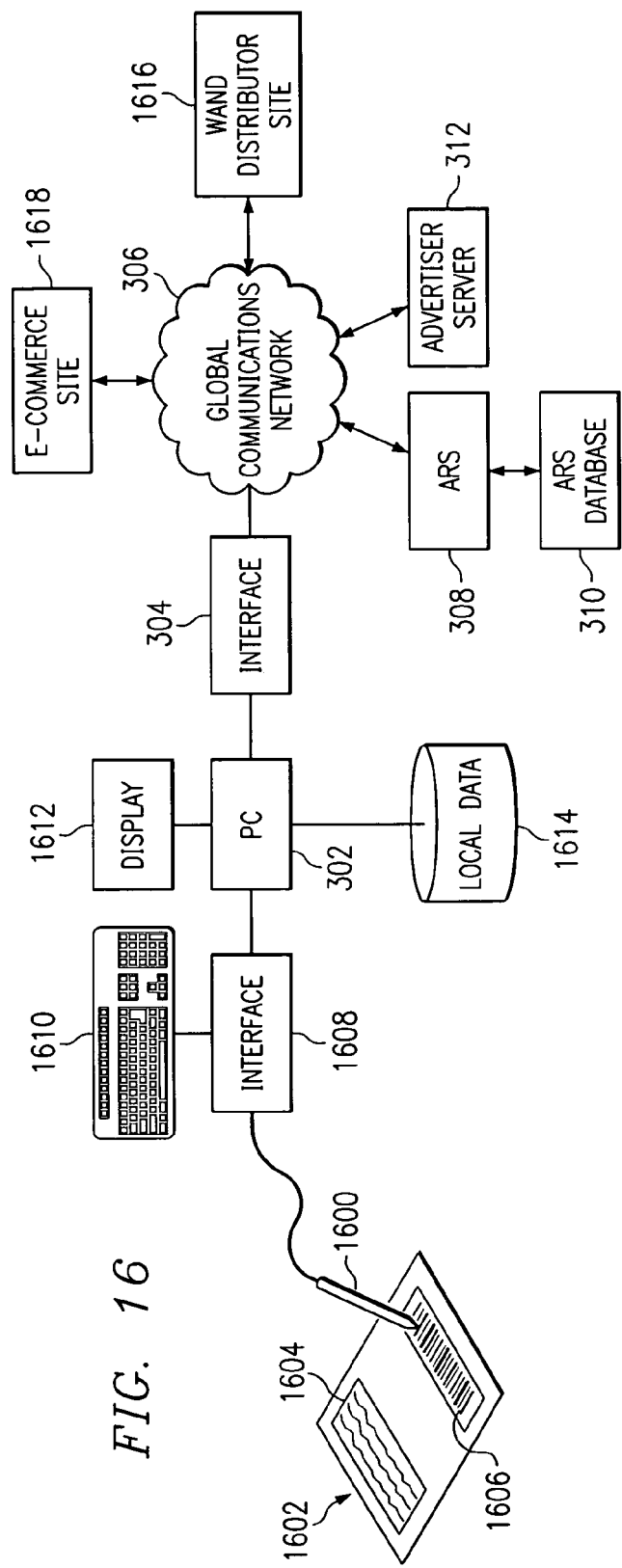
FIG. 16
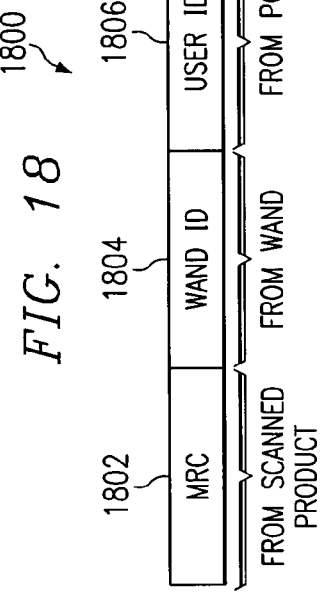
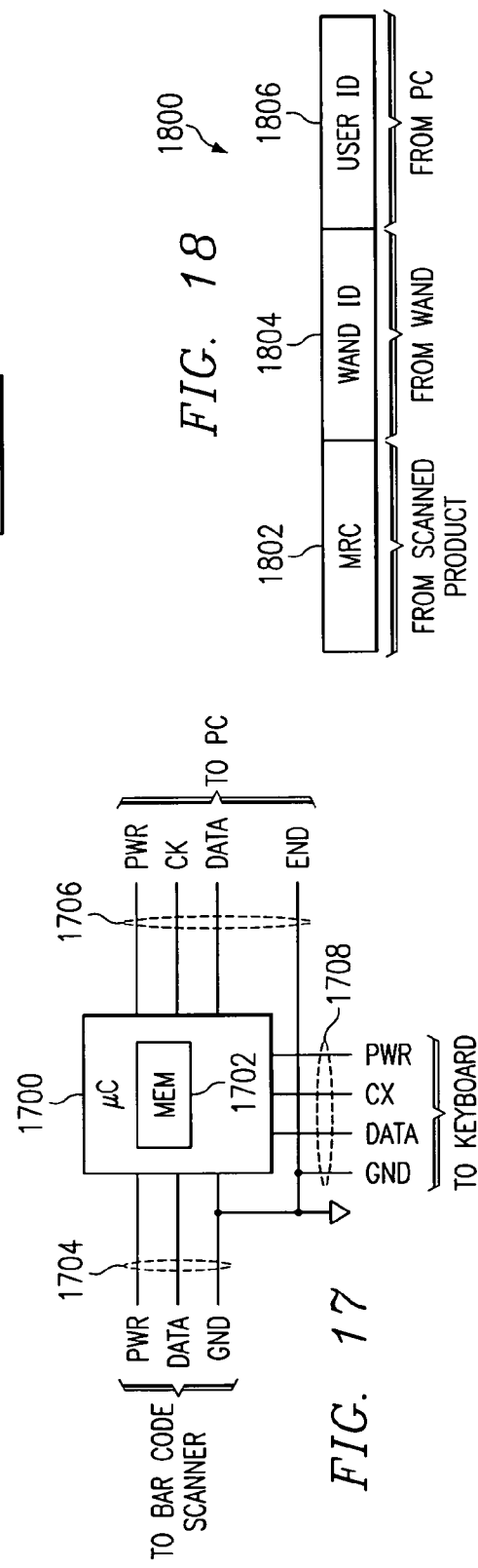
FIG. 17
FIG. 18

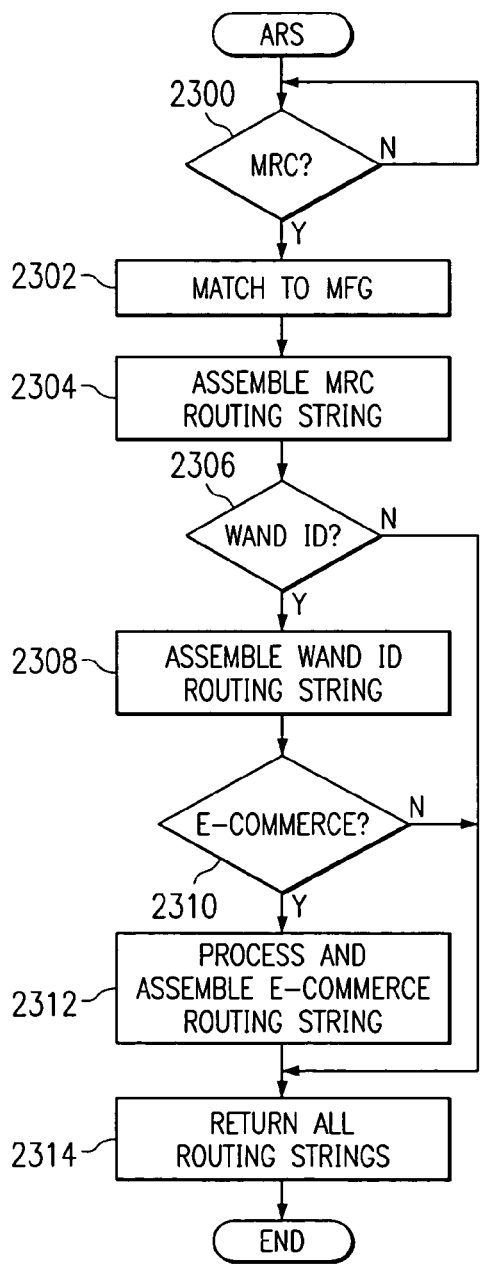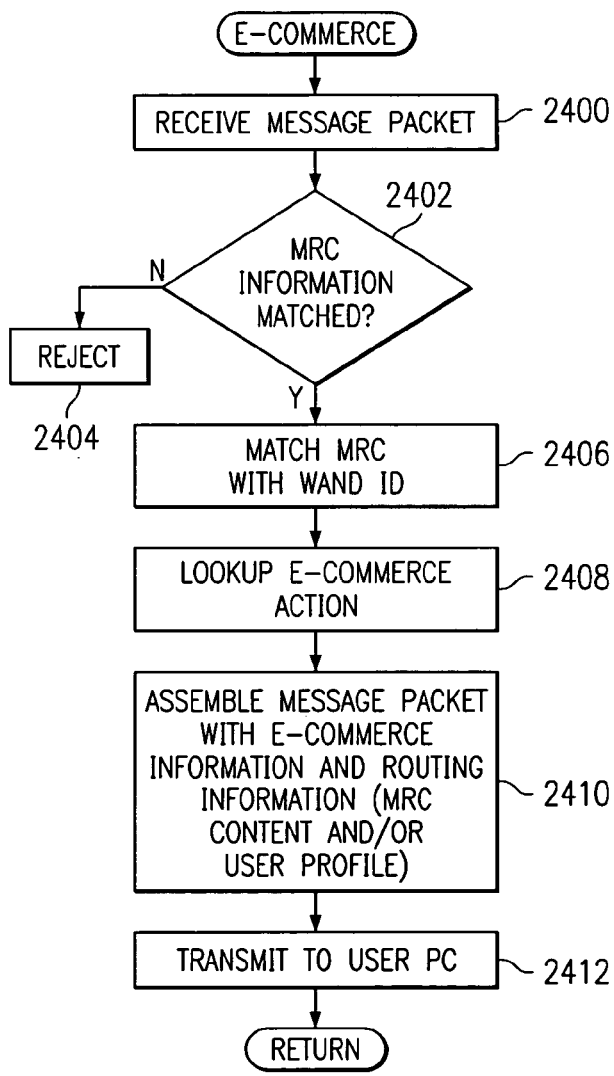

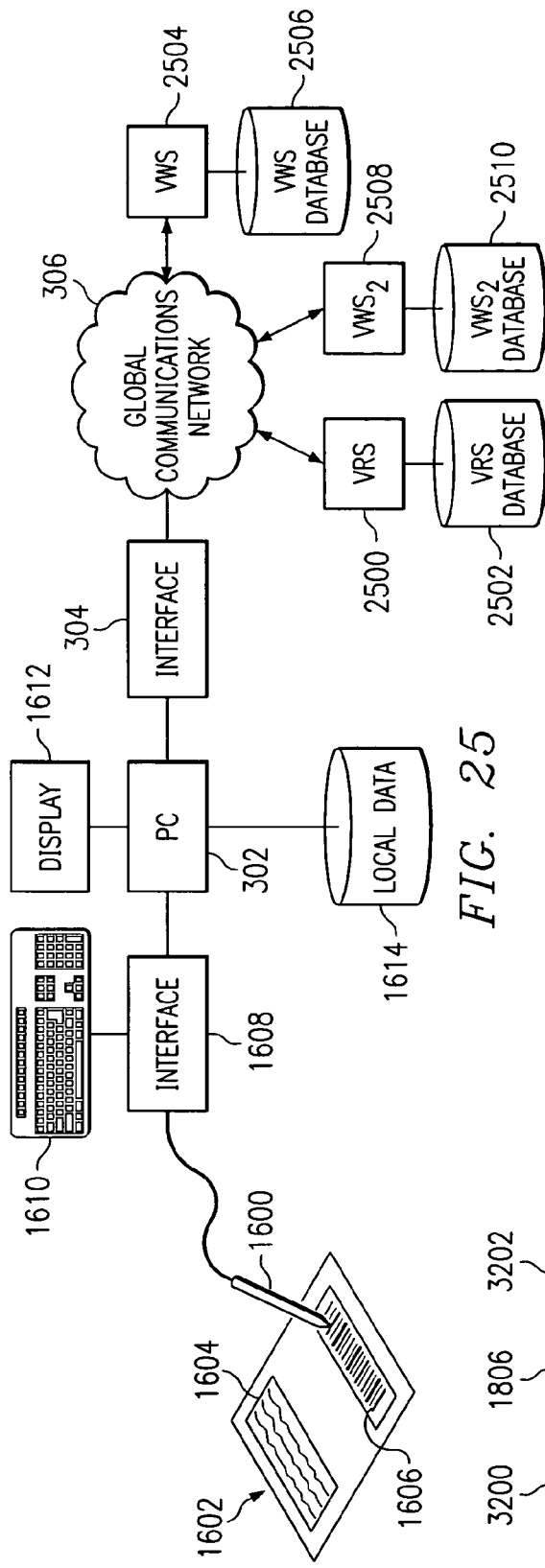

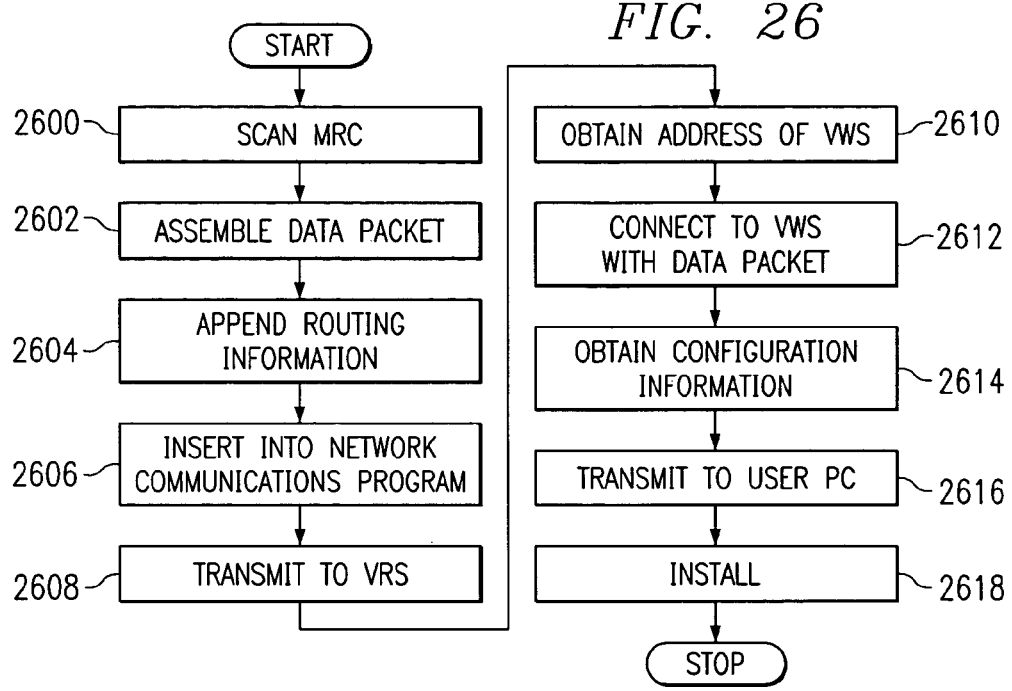
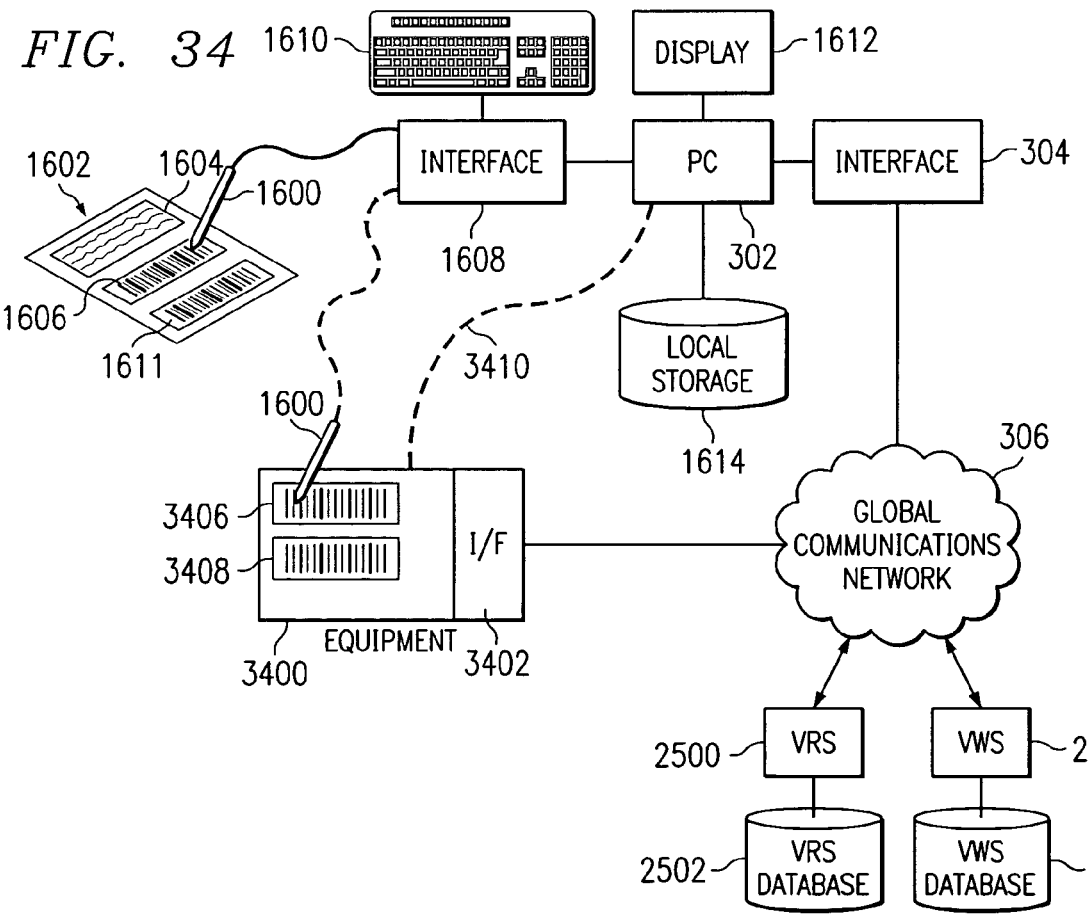

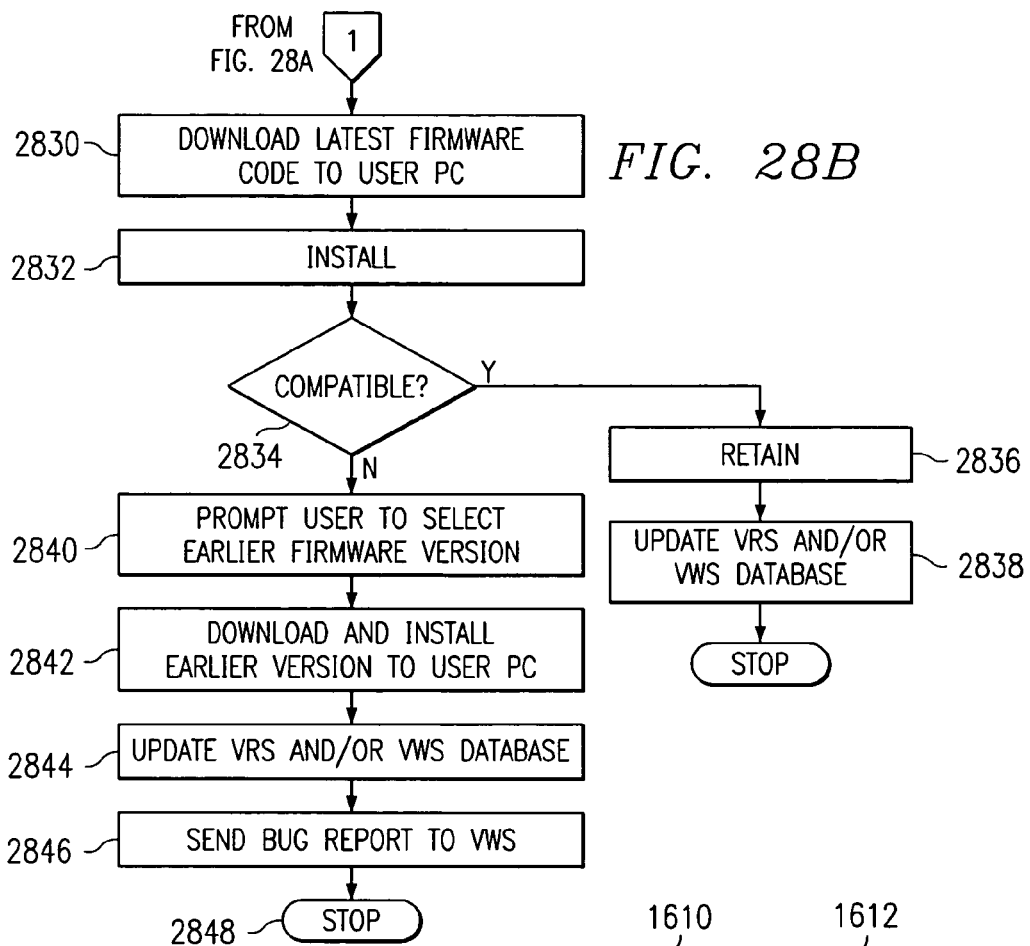
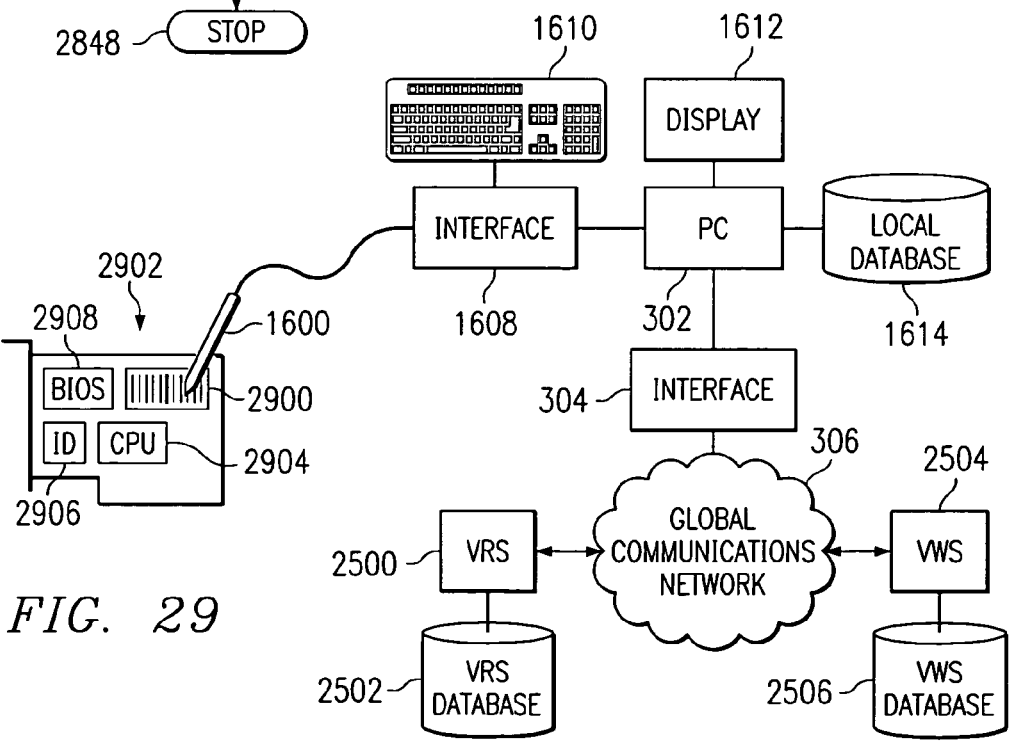
FIG. 29

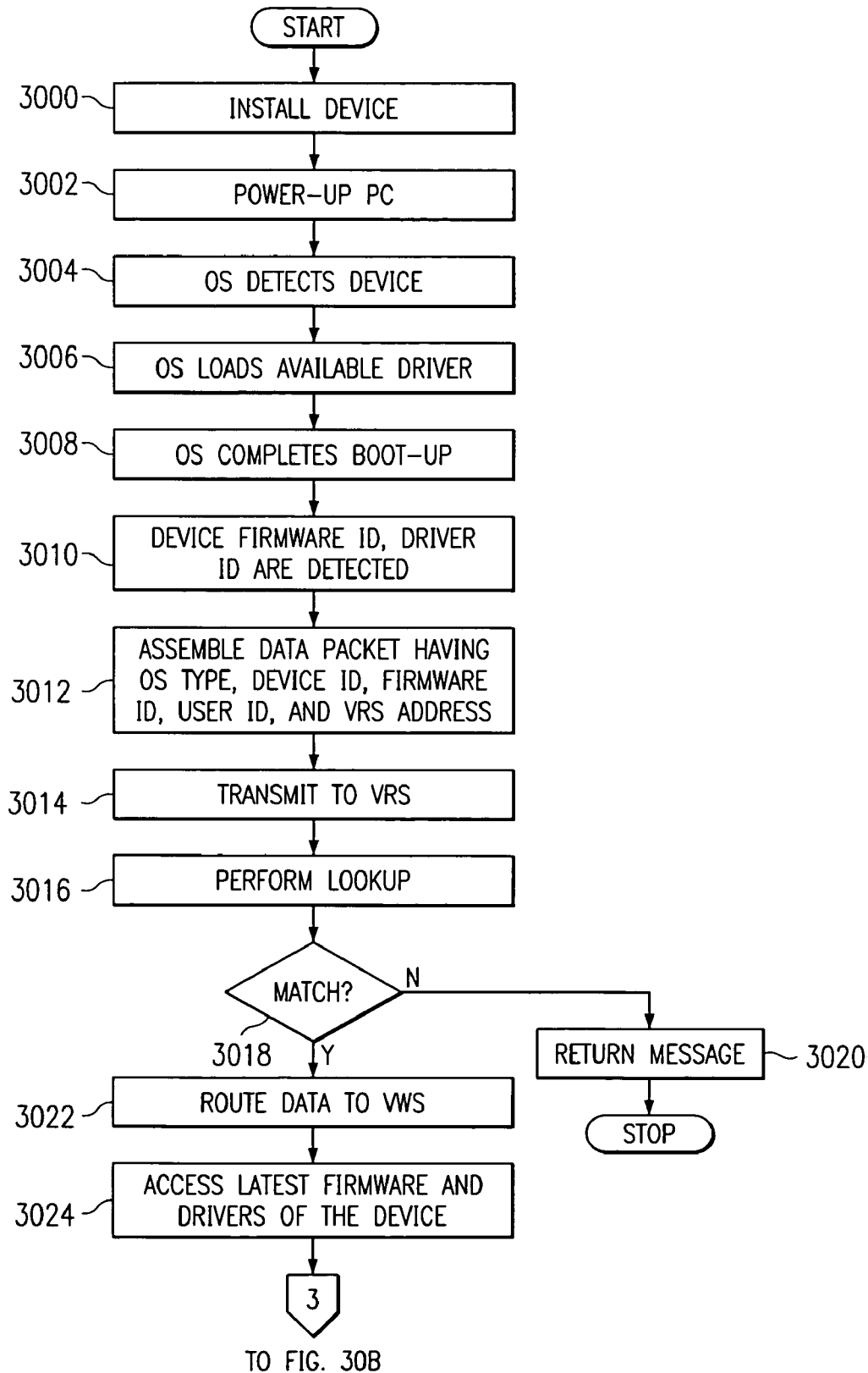

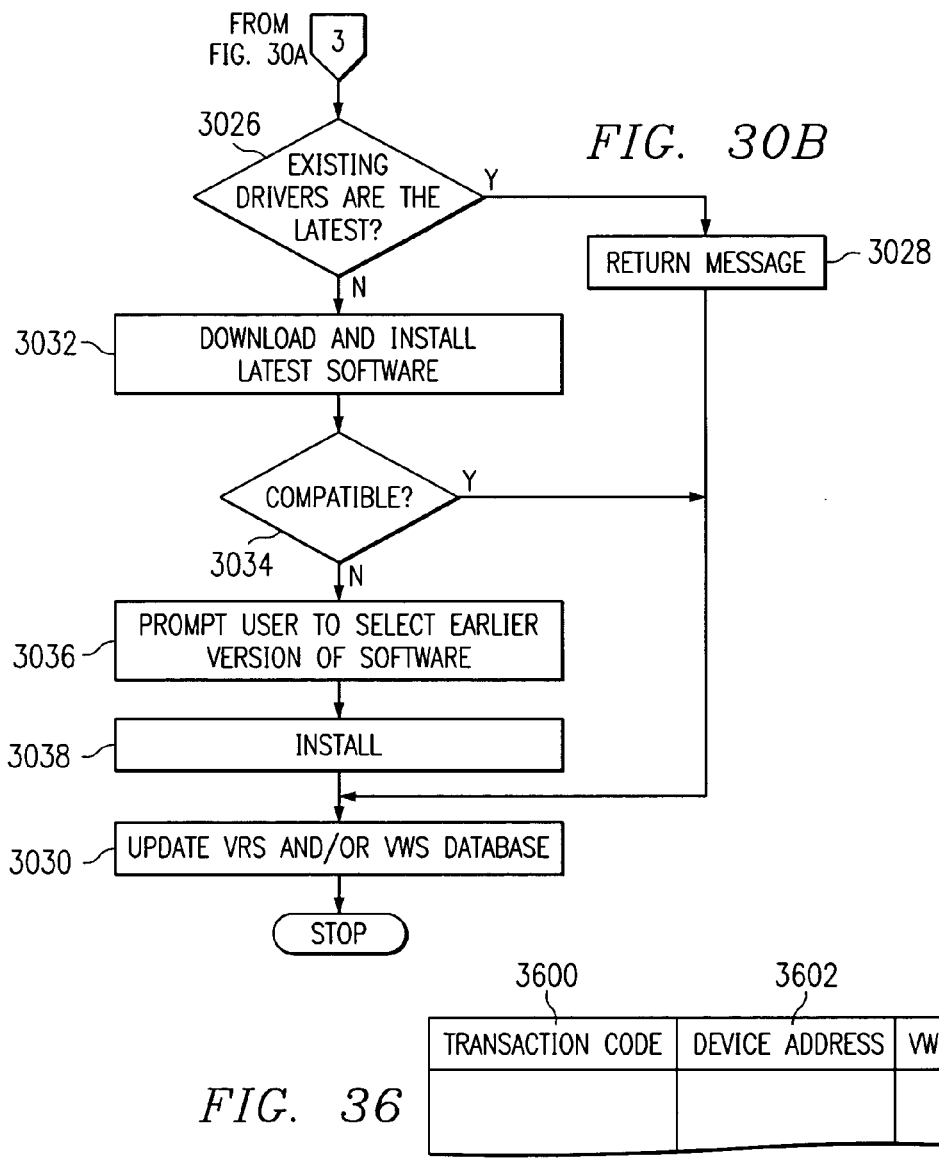

METHOD AND APPARATUS FOR AUTOMATIC CONFIGURATION OF EQUIPMENT

CROSS REFERENCE TO RELATED APPLICATION

This application is Continuation application of U.S. Ser. No. 09/568,148 filed May 10, 2000, entitled METHOD AND APPARATUS FOR AUTOMATIC CONFIGURATION OF EQUIPMENT, issued as U.S. Pat. No. 6,725,260, on Apr. 20, 2004, which is a Continuation-in-Part of U.S. patent application Ser. No. 09/378,221 entitled "METHOD AND APPARATUS FOR ACCESSING A REMOTE LOCATION BY SCANNING AN OPTICAL CODE," filed on Aug. 19, 1999, now U.S. Pat. No. 6,745,234, issued Jun. 1, 2004, which is a Continuation-in-Part of the following two U.S. patent applications: Ser. No. 09/151,471 now abandoned entitled "METHOD FOR INTERFACING SCANNED PRODUCT INFORMATION WITH A SOURCE FOR THE PRODUCT OVER A GLOBAL NETWORK," now abandoned, and Ser. No. 09/151,530 now U.S. Pat. No. 6,098,106 entitled "METHOD FOR CONTROLLING A COMPUTER WITH AN AUDIO SIGNAL," now U.S. Pat. No. 6,098,106, issued Aug. 1, 2000, both filed on Sep. 11, 1998; the present application being related to the following pending U.S. patent applications: Ser. No. 09/496,222 entitled "METHOD FOR INTERFACING SCANNED PRODUCT INFORMATION WITH A SOURCE FOR THE PRODUCT OVER A GLOBAL NETWORK," filed Feb. 1, 2000 now U.S. Pat. No. 6,816,894, issued Nov. 9, 2004; and related to the following pending U.S. patent applications filed on Aug. 24, 1999: Ser. No. 09/382,426 entitled "METHOD AND APPARATUS FOR COMPLETING, SECURING AND CONDUCTING AN E-COMMERCE TRANSACTION;" Ser. No. 09/382,424 entitled "METHOD AND APPARATUS FOR TRACKING USER PROFILE AND HABITS ON A GLOBAL NETWORK," now U.S. Pat. No. 6,836,799, issued Dec. 28, 2004; Ser. No. 09/382,425 entitled "METHOD AND APPARATUS FOR DIRECTING AN EXISTING PRODUCT CODE TO A REMOTE LOCATION," now U.S. Pat. No. 7,228,282, issued Jun. 5, 2007; Ser. No. 09/382,373 entitled "METHOD AND APPARATUS FOR LAUNCHING A WEB SITE WITH A NON-STANDARD CONTROL INPUT DEVICE," now U.S. Pat. No. 7,117,240, issued Oct. 3, 2006; Ser. No. 09/382,371 entitled "METHOD AND APPARATUS FOR LAUNCHING A WEB SITE IN RESPONSE TO SCANNING OF A PRODUCT CODE;" Ser. No. 09/382,422 entitled "UNIQUE ID FOR IDENTIFYING A USER AND FACILITATING AN E-COMMERCE TRANSACTION," now Abandoned; Ser. No. 09/382,377 entitled "METHOD AND APPARATUS FOR LINKING A WEB BROWSER TO A PROMOTIONAL OFFER OVER A GLOBAL NETWORK;" Ser. No. 09/382,375 entitled "METHOD AND APPARATUS FOR UTILIZING AN EXISTING PRODUCT CODE TO ISSUE A MATCH TO A PREDETERMINED LOCATION ON A GLOBAL NETWORK," now U.S. Pat. No. 7,159,037, issued Jan. 2, 2007; Ser. No. 09/379,699 entitled "NETWORK ROUTING UTILIZING A PRODUCT CODE;" Ser. No. 09/379,700 entitled "METHOD FOR INTERCONNECTING TWO LOCATIONS OVER A NETWORK IN RESPONSE TO USING A TOOL," now U.S. Pat. No. 6,701,354, issued Mar. 2, 2004; and related to the following pending U.S. patent applications; Ser. No. 09/417,863 filed Oct. 13, 1999, and entitled "SOFTWARE DOWNLOADING USING A TELEVISION BROADCAST CHANNEL;" Ser. No. 09/417,405 filed Oct. 13, 1999, and entitled "PRESENTATION OF WEB PAGE CONTENT BASED UPON COMPUTER VIDEO RESOLUTION," now U.S. Pat. No. 6,829,646, issued Dec. 7, 2004; Ser. No. 09/496,790 filed Feb. 2, 2000, and entitled "WEB SITE ACCESS BY MANUAL ENTRY OF A CHARACTER STRING INTO A SOFTWARE INTERFACE," now U.S. Pat. No. 6,845,388, issued Jan. 18, 2005; Ser. No. 09/496,208 filed Feb. 2, 2000, and entitled "BAR CODE SCANNER AND SOFTWARE INTERFACE INTERLOCK," now U.S. Pat. No. 6,757,715, issued Jun. 29, 2004; Ser. No. 09/490,336 filed Jan. 1, 2000, and entitled "INPUT DEVICE HAVING POSITIONAL AND SCANNING CAPABILITIES," now U.S. Pat. No. 6,868,433, issued Mar. 15, 2005; Ser. No. 09/497,252 entitled "METHOD AND APPARATUS FOR ALLOWING A REMOTE SITE TO INTERACT WITH AN INTERMEDIATE DATABASE TO FACILITATE ACCESS TO THE REMOTE SITE" filed on Feb. 3, 2000, now U.S. Pat. No. 6,622,165, issued Sep. 16, 2003; Ser. No. 09/491,142 entitled "INPUT DEVICE FOR ALLOWING INPUT OF UNIQUE DIGITAL CODE TO A USER'S COMPUTER TO CONTROL ACCESS TO A WEB SITE" filed Jan. 26, 2000, now U.S. Pat. No. 6,985,954, issued Jan. 10, 2006; Ser. No. 09/491,136 entitled "UNIQUE BAR CODE FOR INDICATING A LINK BETWEEN A PRODUCT AND A REMOTE LOCATION ON A WEB NETWORK" filed on Jan. 26, 2000 now U.S. Pat. No. 6,708,208, issued Mar. 16, 2004; Ser. No. 09/494,925 entitled "ROUTING STRING INDICATIVE OF A LOCATION OF A DATABASE ON A WEB ASSOCIATED WITH A PRODUCT OF COMMERCE" filed on Feb. 1, 2000, now U.S. Pat. No. 6,377,986, issued Apr. 23, 2002; Ser. No. 09/494,924 entitled "INPUT DEVICE FOR ALLOWING INTERFACE TO A WEB SITE IN ASSOCIATION WITH A UNIQUE INPUT CODE" filed on Feb. 1, 2000; Ser. No. 09/537,530 entitled "METHOD AND APPARATUS FOR ACCESSING A REMOTE LOCATION BY SENSING A MACHINE-RESOLVABLE CODE" filed Mar. 29, 2000, now U.S. Pat. No. 6,701,369, issued Mar. 2, 2004; and Ser. No. 09/539,596 entitled "METHOD AND APPARATUS FOR ALLOWING A REMOTE SITE TO INTERACT WITH AN INTERMEDIATE DATABASE TO FACILITATE ACCESS TO THE REMOTE SITE" filed on Mar. 31, 2000, now U.S. Pat. No. 6,973,438, issued Dec. 6, 2005.

TECHNICAL FIELD OF THE INVENTION

This invention is related to a method of computer control, and particularly for automatically configuring a computer or components thereof, either hardware or software, in response to reading information.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . ." down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

SUMMARY OF THE INVENTION

The present invention disclosed and claimed herein, in one aspect thereof, comprises a method and architecture for configuring a piece of equipment. A piece of equipment is provided in communication with a network, the piece of equipment having one or more machine-resolvable codes associated therewith. The piece of equipment is connected to a remote location disposed on the network in response to reading a select one of the one or more machine-resolvable codes with a reader. Configuration information associated with the select one of the one or more machine-resolvable codes is transmitted from the remote location to the piece of equipment, and the piece of equipment is then configured according to the configuration information.

BRIEF DESCRIPTION OF THE DRAWINGS

For a more complete understanding of the present invention and the advantages thereof, reference is now made to the following description taken in conjunction with the accompanying Drawings in which:

FIG. 8 illustrates a web browser page receiving the modified URL/advertiser product data according to the preferred embodiment;

FIG. 9 illustrates a simplified block diagram of the disclosed embodiment;

FIG. 16 illustrates a general block diagram of a disclosed embodiment;

FIG. 17 illustrates the conversion circuit of the wedge interface;

FIG. 18 illustrates a sample message packet transmitted from the user PC to the ARS;

FIG. 23 illustrates a flowchart according to the ARS;

FIG. 24 illustrates a flowchart of the process performed at the E-commerce node;

FIG. 25 illustrates a system block diagram of a preferred embodiment for scanning machine-resolvable code of a document;

FIG. 26 illustrates a flowchart of general operation of a preferred embodiment;

FIGS. 28A and 28B illustrate a flowchart for the process of obtaining configuration information related to a firmware update where user PC and hardware/software data is transmitted from the user PC;

FIG. 29 illustrates a system block diagram of a preferred embodiment for scanning a device machine-resolvable code;

FIGS. 30A and 30B illustrate a flowchart for an alternative embodiment where connection of the device to a computer automatically initiates the update process;

FIG. 32A illustrates a basic database structure of the VRS database;

FIG. 32B illustrates a more complex database structure is illustrated where the VRS database contains the user profile information;

FIG. 34 illustrates an alternative embodiment wherein a piece of equipment is automatically configured in accordance with a scanned transaction code;

FIG. 36 illustrates a sample basic database structure for the equipment configuration embodiment; and FIG. 37 illustrates a sample enhanced database structure of the VRS database according to automatic configuration of a piece of test equipment.

DETAILED DESCRIPTION OF THE INVENTION

Figure 1:
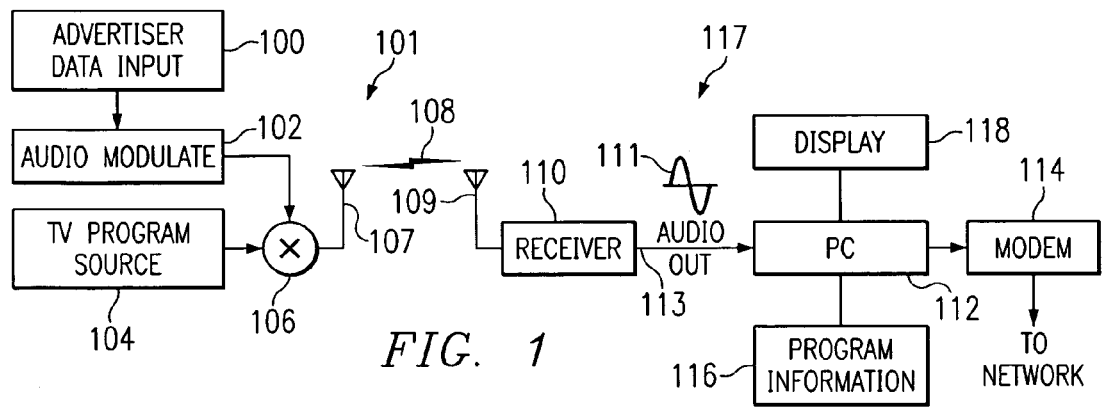
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being an RCA type jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick-up the audio signal. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data is formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data merely can be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by placing the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
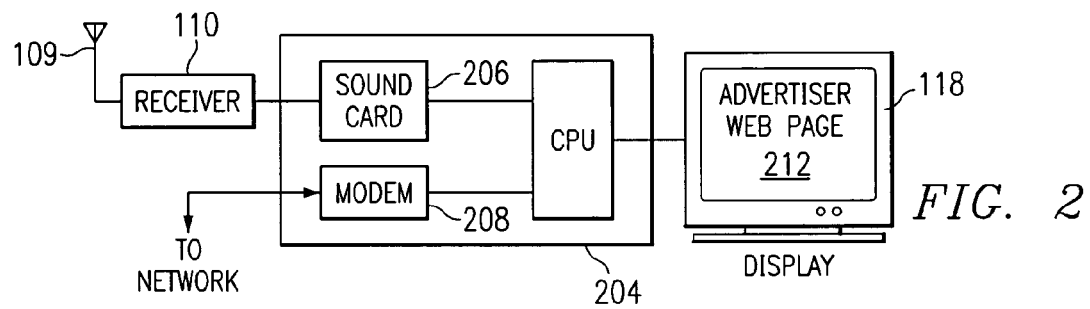
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application; in this particular embodiment, the web browser application located on the PC 204. Coded advertiser information contained within the audio signal is then extracted and appended with the address of a proprietary server located on the communication network. The remote server address is in the form of a URL.

This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a realtime broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
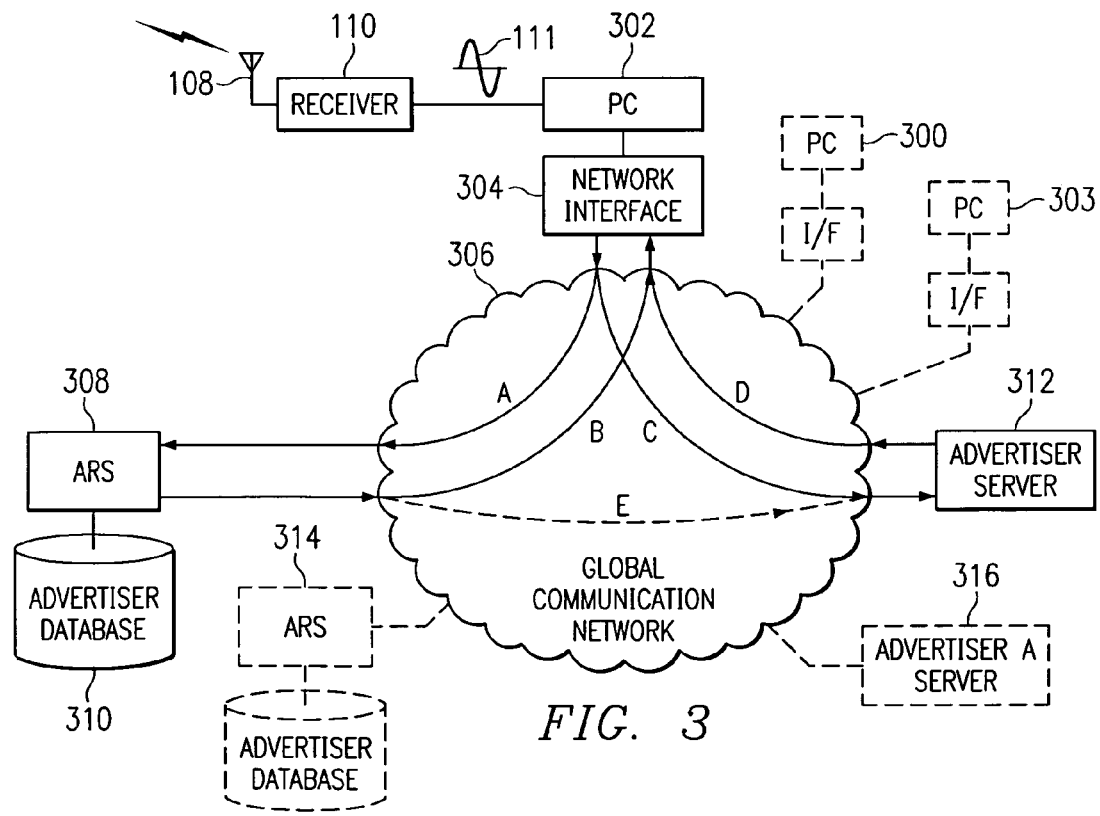
FIG. 3 illustrates system interactions over a global network.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the network 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe to this technology, manufacturer and product information are added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4a-4e illustrate the various message packets transmitted between the source PC and network servers used in the preferred embodiment.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Figure 4C:

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Figure 4D:

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Figure 4E:

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figure 5:
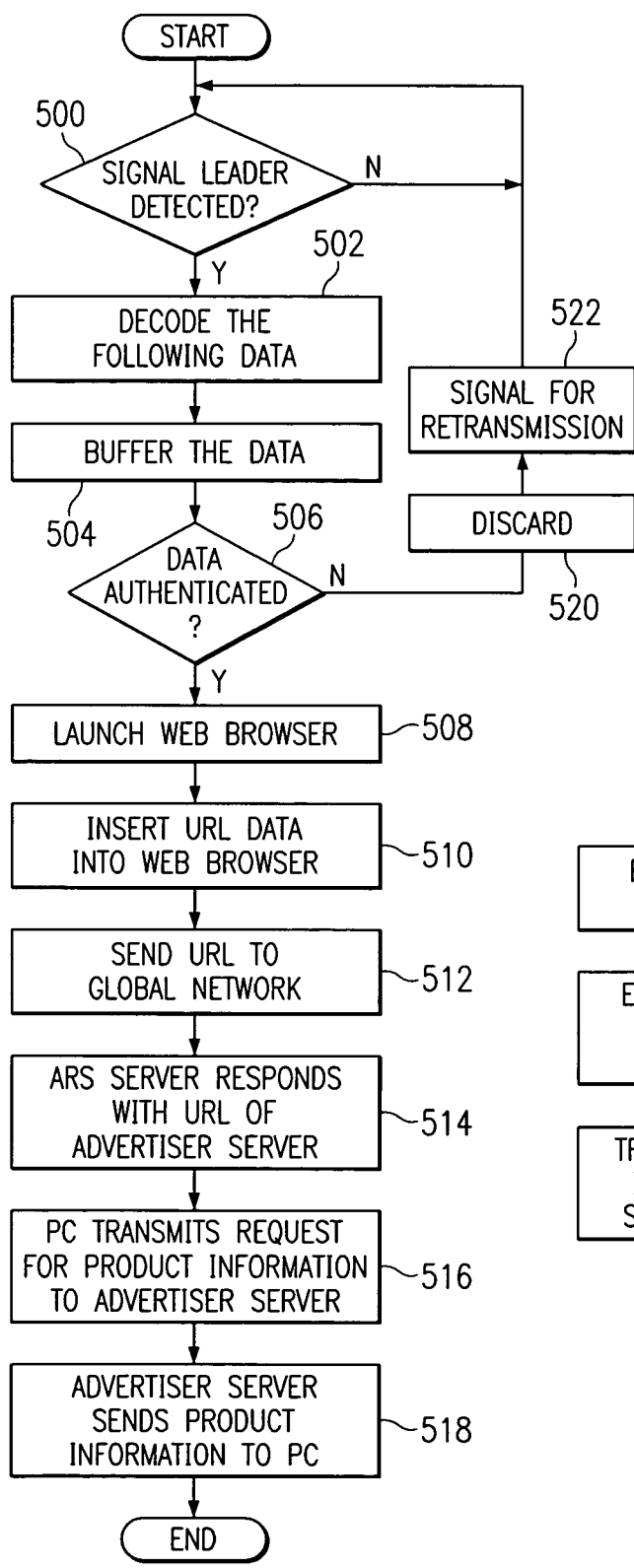
FIG. 5 is a flowchart depicting operation of the system according to the preferred embodiment.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing. The user may obtain the benefits of this architecture by simply downloading the proprietary software over the network. Other methods for obtaining the software are well-known; for example, by CD, diskette, or pre-loaded hard drives.

Figure 6:
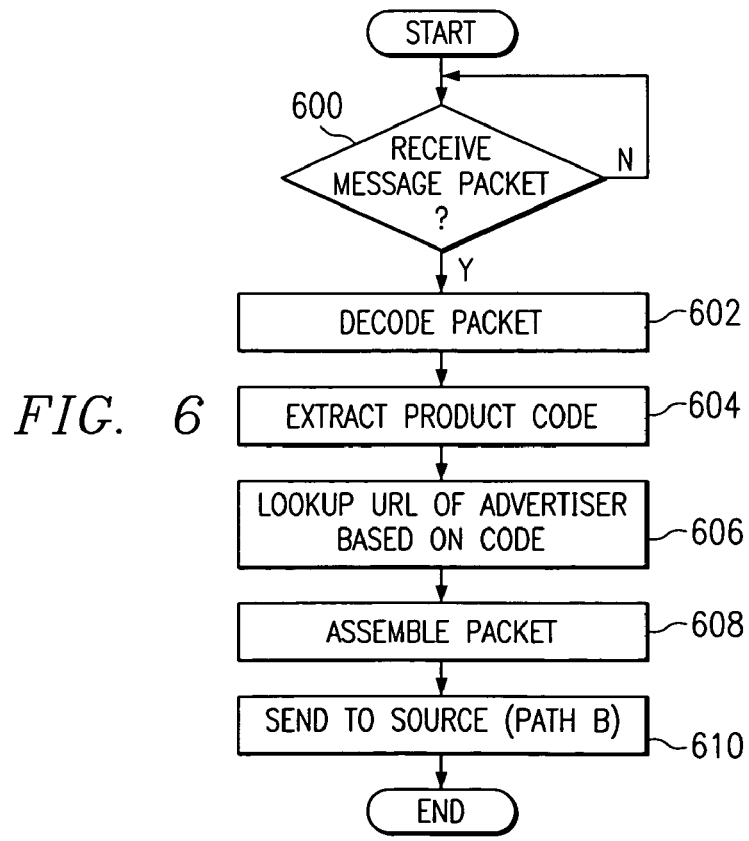
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Figure 7:
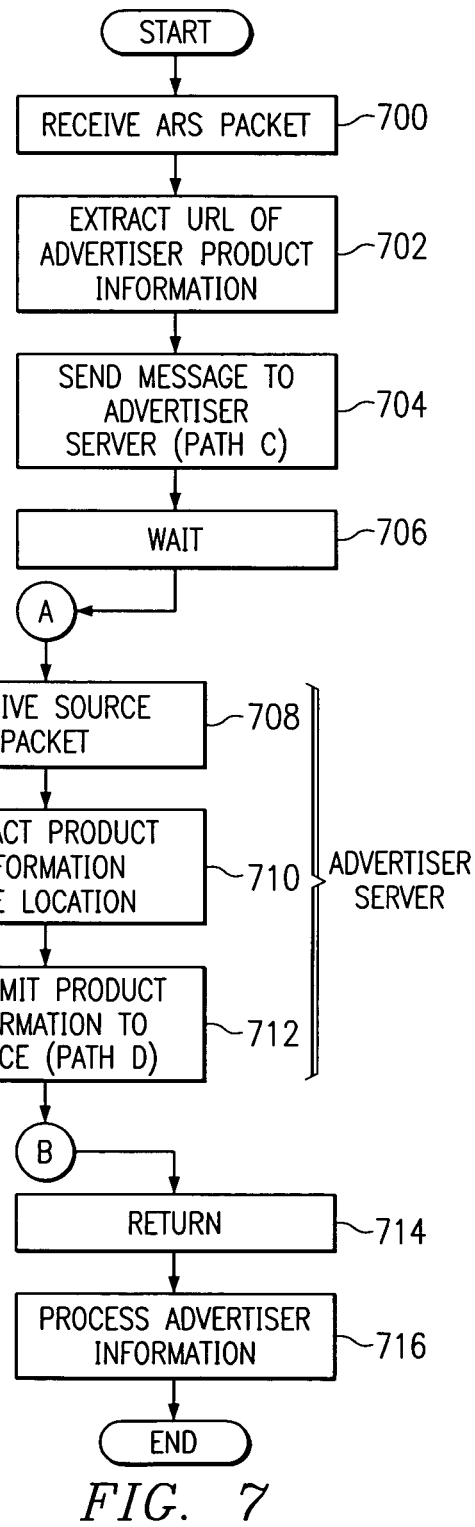
FIG. 7 illustrates a flowchart of the interactive process between the source computer and ARS.

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters/? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/ product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Figure 10:
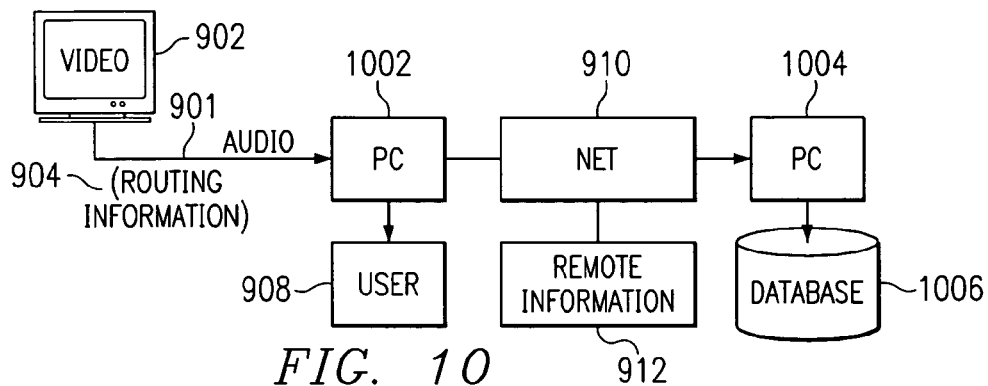
FIG. 10 illustrates a more detailed, simplified block diagram of the embodiment of FIG. 9.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Figure 11:
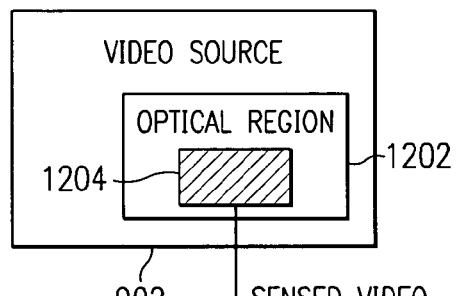
FIG. 11 illustrates a diagrammatic view of a method for performing the routing operation.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Figure 12:
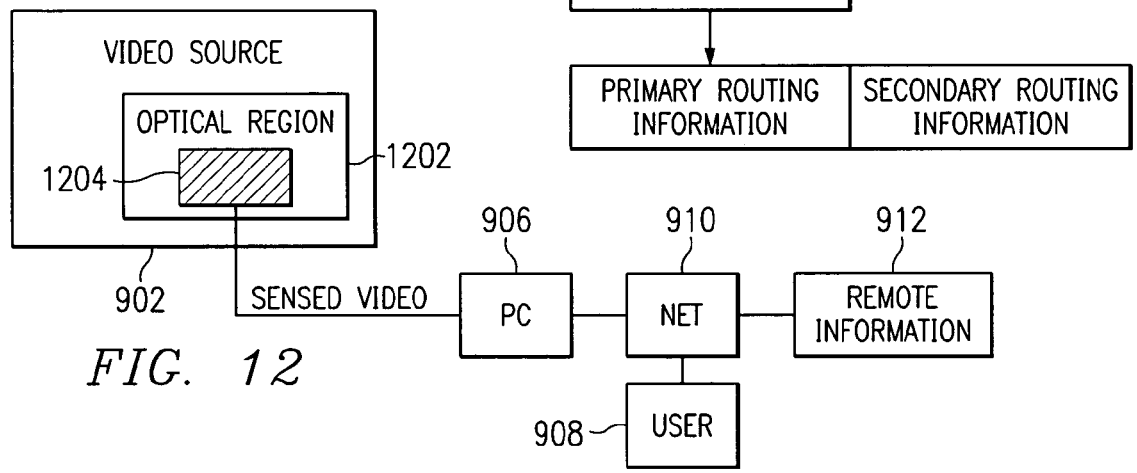
FIG. 12 illustrates a block diagram of an alternate embodiment utilizing an optical region in the video image for generating the routing information.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Figure 13:
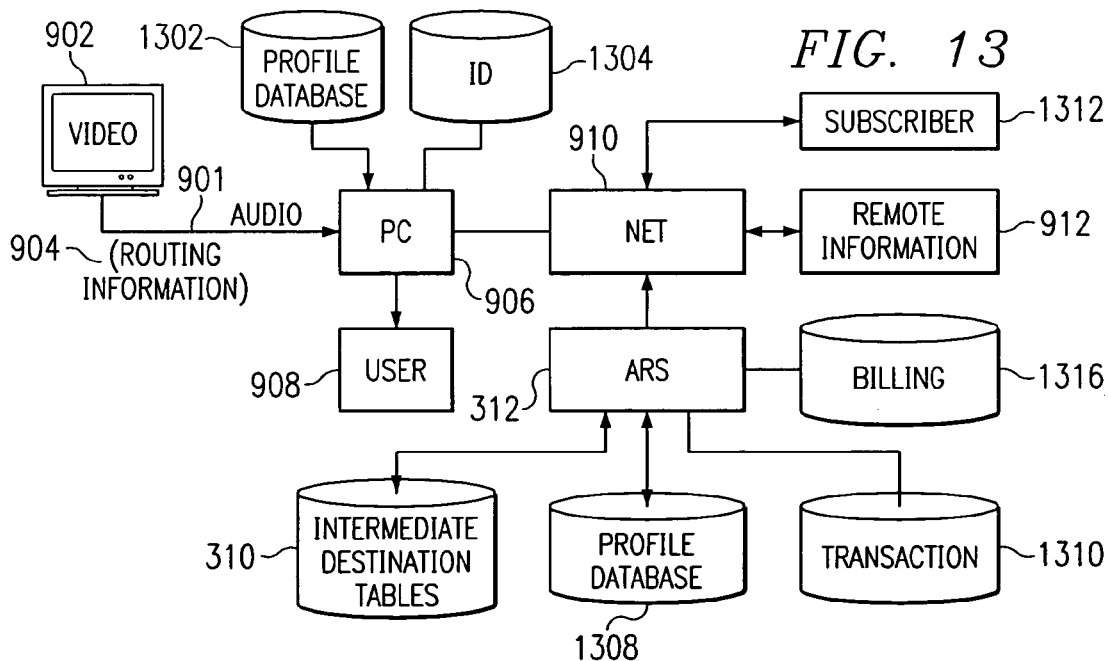
FIG. 13 illustrates a block diagram illustrating the generation of a profile with the disclosed embodiment.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored profiles 908 in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will be associated therewith, the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
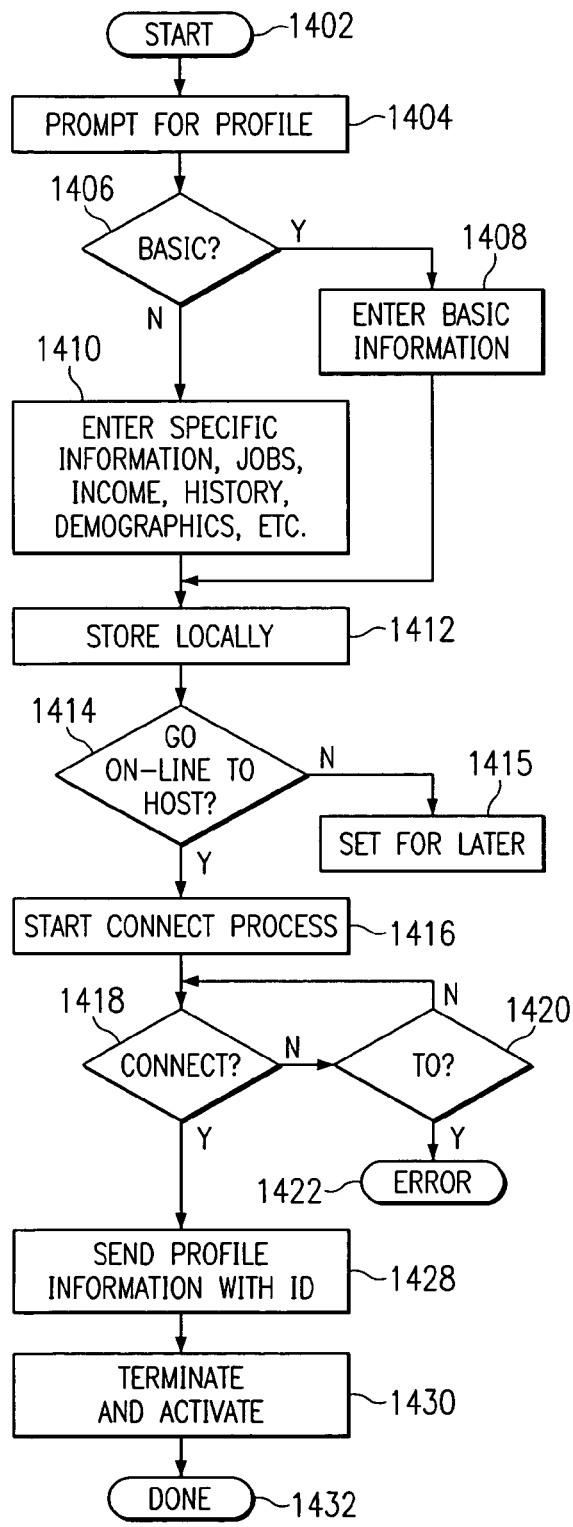
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" that steps the user through the setup process. Once complete, the program will flow to a Done block 1432.

Figure 15:
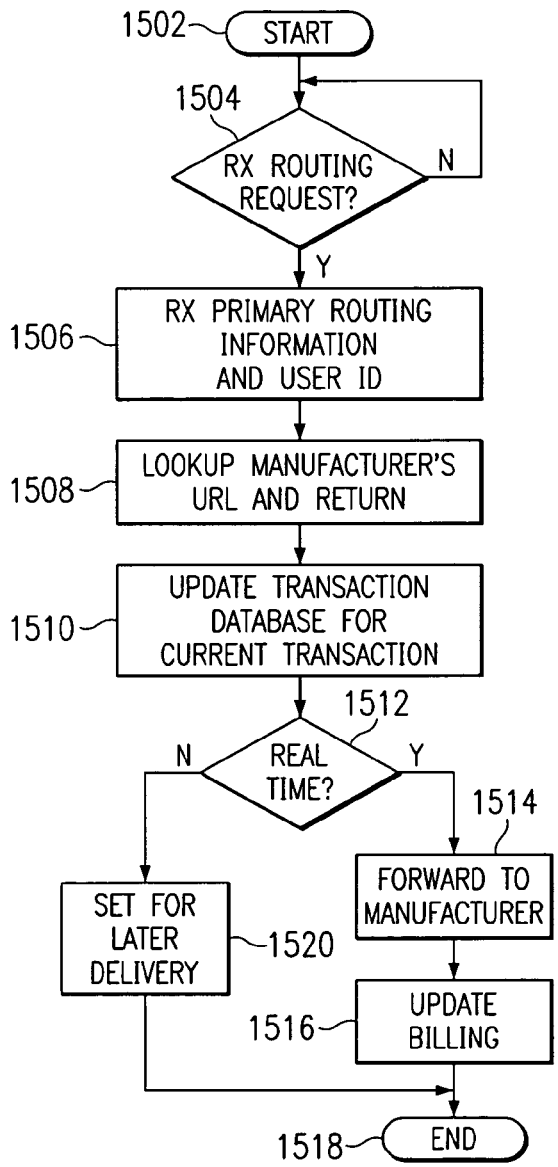
FIG. 15 illustrates a flowchart for processing the profile information when information is routed to a user.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to lookup the manufacturer URL that corresponds to the received primary routing information and then return the necessary command information to the originating PC 108 in order to allow that PC 108 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are viewed or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user PC 302 which will cause the user PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user PC 302 and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A machine-resolvable code (MRC) scanning wand 1600 is provided by a wand distributor to customers and is associated with that distributor via a wand ID stored therein. The wand 1600 is either sold or freely distributed to customers for use with their personal computing systems. Since more and more products are being sold using MRCs, it can be appreciated that a user having the wand 1600 can scan MRCs of a multitude of products in order to obtain more information. Information about these products can be made immediately available to the user from the manufacturer for presentation by the user's computer 302. Beyond simply displaying information about the product in which the user is interested, the wand distributor may include additional advertising information for display to the user such as information about other promotions or products provided or sold by the wand distributor. Similarly, advertisers may provide catalogs of advertisements or information in newspapers or periodicals where the user simply scans the MRC associated with the advertisement using the wand 1600 to obtain further information. There is provided a paper source 1602 having contained thereon an advertisement 1604 and an associated MRC 1606. (Note that the disclosed concept is not limited to scanning of MRCs 1606 from paper sources 1602, but is also operable to scan a MRC 1606 on the product itself. Also, the wand 1600 can be any type of device that will scan any type of image having information encoded therein.)

After obtaining the wand 1600 from the wand distributor, the user connects the wand 1600 to their PC 302. During a scanning operation, wand 1600 reads MRC data 1606 and the wand ID into a "wedge" interface 1608 for conversion into keyboard data, which keyboard data is passed therefrom into the keyboard input port of PC 302. The importance of the wand ID will be discussed in more detail hereinbelow.

The wedge interface 1608 is simply an interface box containing circuitry that accommodates inputs from both the scanning wand 1600 and a computer keyboard 1610. This merely allows the information scanned by the wand 1600 to be input into the PC 302. In the disclosed embodiment, the wedge interface 1608 will convert any information. The data output from the wand 1600 is passed into the wedge interface 1608 for conversion into keyboard data which is readily recognizable by the PC 302. Therefore, the wand 1600 is not required to be connected to a separate port on the PC 302. This data is recognized as a sequence of keystrokes. However, the output of the wand 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the MRC 1606 and conversion thereof to keystroke input data.

In operation, the product code of a product is provided in the form of a MRC 1606. This MRC 1606 is the "link" to a product. The disclosed embodiment is operable to connect that product information contained in the MRC 1606 with a web page of the manufacturer of that product by utilizing the MRC 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The MRC 1606 by itself is incompatible with any kind of network for the purposes of communication therewith. It is primarily provided for a retail-type setting. Therefore, the information contained in the MRC 1606, by itself, does not allow for anything other than identification of a product, assuming that one has a database 1614 containing information as to a correlation between the product and the MRC 1606.

The wedge interface 1608 is operable to decode the MRC 1606 to extract the encoded information therein, and append to that decoded MRC information relating to an ID for the wand 1600. This information is then forwarded to the ARS 308 by the resident program in the PC 302. This is facilitated by intermediate routing information stored in the program indicating to which node on the GCN 306 the scanned MRC information is to be sent, i.e., to the ARS 308. It is important to note that the information in the MRC 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the wand ID and the user ID. If another type of communications program were utilized, then it would have to be converted into language compatible with that program. Of course, a user could actually key in the information on the MRC 1606 and then append the appropriate intermediate routing information thereafter. As will be described hereinbelow, the intermediate routing information appended thereto is the URL of the ARS 308 disposed on the GCN 306.

As part of the configuration for using the wand 1600, the PC 302 hosts wand software which is operable to interpret data transmitted from the wand 1600, and to create a message packet having the scanned product information and wand ID, routing information, and a user ID which identifies the user location of the wand 1600. The wand software loads at boot-up of the PC 302 and runs in the background. In response to receiving a scanned MRC 1606, the wedge interface 1608 outputs a keystroke code (e.g., ALT-F10) to bring the wand program into the foreground for interaction by the operating system. The wand program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The wand program running on PC 302 functions to partition the browser window displayed to the user into several individual areas. This is for the purpose of preparing to present to the user selected information in each of the individual areas (also called "framing"). The selected information comprises the product information which the user requested by scanning the MRC 1606 using the wand 1600, information about the wand distributor which establishes the identity of the company associated with that particular wand 1600, and at least one or more other frames which may be advertisements related to other products that the wand distributor sells. Note that the advertisements displayed by the wand distributor may be related to the product of interest or totally unrelated. For example, if a user scans the MRC 1606 of a soda of Company A, the wand distributor may generate an advertisement of a new soft drink being marketed by Company A, that it sells. On the other hand, the wand distributor may also structure the display of information to the user such that a user requesting product information of a Product X may get the requested information of Product X along with advertisements for a competing item Product Y. Essentially, the wand distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the wand distributor site 1616 and E-commerce site 1618 to obtain the information that needs to be framed in the browser window displayed to the user.

Therefore, the wand 1600 is associated with the wand distributor by way of a wand ID such that scanning a product MRC 1606 in order to obtain information about that particular product generates one or more responses from one or more remote sites disposed on the GCN 306. Stored in the wand 1600 is the wand ID which establishes its relationship to the wand distributor. Proprietary wand software running on the PC 302 operates to decode scanned MRC information and the wand ID received from the wand 1600 and wedge interface 1608, and also provides a unique user ID for establishing the location of the user of the wand 1600. The wand software also assembles message packets and works in conjunction with the onboard communication software (e.g., a browser) to automatically route the message packets across the GCN 306 such that the one or more remote sites disposed on the GCN 306 return information to be framed for presentation to the user.

Referring now to FIG. 17, there is illustrated a conversion circuit of the wedge interface. A microcontroller 1700 provides conversion of the data from the wand 1600 and controls interfacing of the keyboard 1610 and wand 1600 with the PC 302. The microcontroller 1700 has contained therein a memory 1702 or it can have external memory. There are provided a plurality of wand interfaces 1704 to the wand 1600, a plurality of PC interfaces 1706 to the PC 302, and plurality of keyboard interfaces 1708 to the keyboard 1610. In general, the wand interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the wand 1600, the serial data is not compatible with a keyboard 1610 and, therefore, it must be converted into a keyboard format in order to allow input thereof to the keyboard input of the PC 302.

The microcontroller 1700 performs this function after decoding this MRC information, and conversion of this MRC information into an appropriate stream of data which is comprised of the MRC information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the wand 1600 and the keyboard 1610 to the PC 302 which allows the wand 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the wand 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4 k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with wand 1600.

It should be noted that, although in this particular embodiment MRC information of the MRC 1606 is input into the keyboard input port of the PC 302, disclosed methods may also be advantageously utilized with high speed port architectures such as Universal Serial Bus ("USB") and IEEE 1394.

MRCs (e.g., bar codes) are structured to be read in either direction. Timing considerations need to be addressed because of the variety of individuals scanning the MRC introduce a wide variety of scan rates. MRCs use bars of varying widths. The presence of a black bar generates a positive pulse, and the absence of a black bar generates no pulse. Each character of a conventional MRC has associated therewith seven pulses or bars.

Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the MRC information 1802 obtained from the user scanning the MRC 1606 with the wand 1600; the wand ID 1804 which is embedded in a memory in the wand 1600 and identifies it with a particular wand distributor; and a user ID 1806 which is derived from the software running on the PC 302 and which identifies uniquely with the user location. Note that the message packet includes other necessary information for the proper transmission for point to point.

Figure 19:
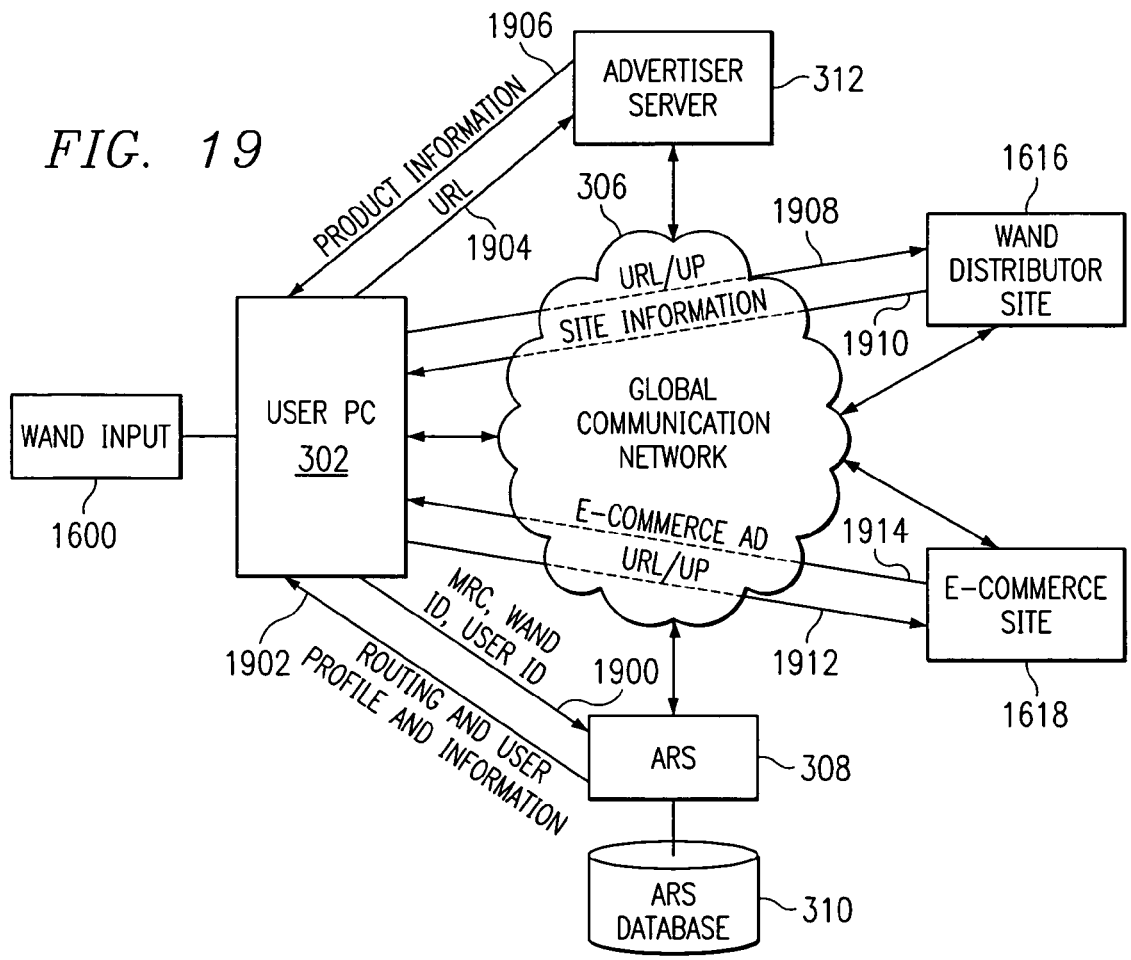
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a MRC 1606 using the wand 1600, a wand program running on the user PC 302 is operable to interpret the information output by the wand 1600 and generate a message packet for transmission over the GCN 306. The wand program assembles the message packet such that it is directed to the ARS 308 disposed on the GCN 306. The message packet contains several pieces of information including the wand ID 1804 which links it to the wand distributor, the user ID 1806 which identifies the particular user using the wand 1600, and MRC information 1802 describing a particular product of interest to the user. This message from the PC 302 is transmitted over a path 1900 to the ARS 308 where the ARS database 310 is accessed to cross reference the ID information 1804 and MRC information 1802 to a particular advertiser and wand distributor. The ARS 308 returns a message packet over a path 1902 to the user PC 302 which contains routing information as to the location of various other sites disposed on the GCN 306, for example, the advertiser server 312 and wand distributor site 1616.

It can be appreciated that other information can also be provided by the ARS 308 which more closely targets the particular user of the wand 1600. For example, if it is known that a particular wand 1600 is sold in a certain geographic area, this information can be useful in targeting the particular user with certain advertising information relevant to that geographic area. In any case, the information returned from the ARS 308 over path 1902 provides enough information for the wand program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the wand distributor site and the user profile) to the wand distributor site 1616 over a path 1908 in order to obtain information back over a path 1910 for framing any banners which identify the wand distributor. Additionally, the user PC 302 forwards a message packet to the E-commerce site 1618 over a path 1912 in order to return information regarding any particular advertisements the wand distributor wants to display to the user. The advertisements are returned to the PC 302 over a path 1914.

Figure 20:
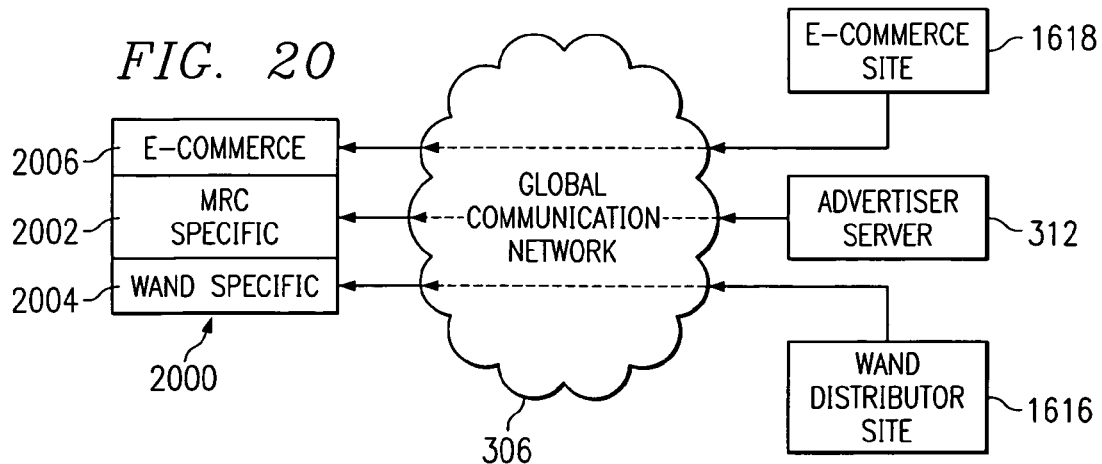
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. An MRC area 2002 displays that product information in which the user was interested; a wand-specific area 2004 displays information about the wand distributor; and an E-commerce area 2006 displays advertising information that the wand distributor selects for display according to this particular user and wand 1600. As mentioned hereinabove, a program operable to process scanned MRC information with the unique wand 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular MRC specific area 2002. Information placed in the wand specific area 2004 is information about the wand distributor which is returned from the wand distributor site 1616 across GCN 306.

Figure 21:
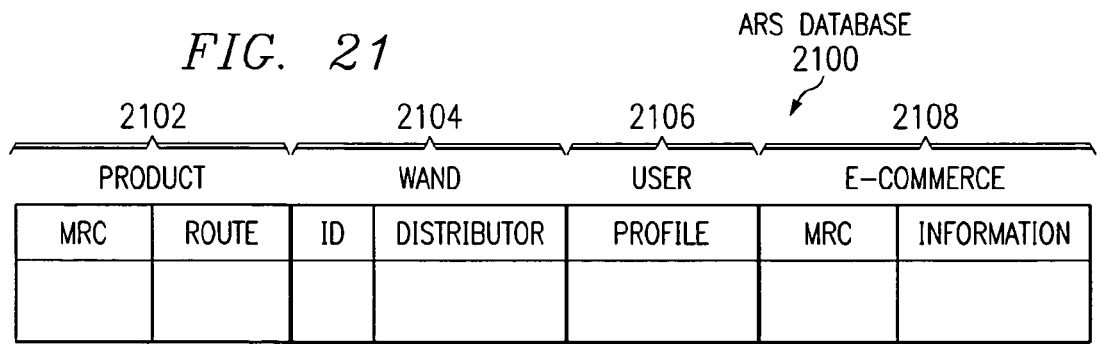
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the MRC 1606 with the wand 1600. Under a Product heading 2102 are listed the particular MRCs and associated routing information for addressing the respective server location. For example, the ARS server 308 may contain any number of advertisers having unique URL addresses associated therewith. Therefore, the MRC 1606 of a particular product is associated with a unique URL address which routes any request for information of that product to that particular advertiser's site. Also part of the ARS database structure 2000 is a heading of Wand 2104 under which is the wand ID 1804 and the distributor associated with that wand ID 1804.

It can be appreciated that there may be a number of distributors using the disclosed architecture such that each distributor has an ID embedded in the wand 1600 which uniquely identifies that wand with the particular distributor. Therefore, the unique wand ID 1804 needs to be listed with the respective distributors of that wand 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the wand software running on the PC 302 and upon installation or subsequent configuration may request that the user input certain profile information which maybe used to target that particular user with products and services which identify with that user profile. The ARS database structure 2100 also contains an E-commerce heading 2108 which contains information related to the MRC 1606 and an advertisement that may be triggered by the request for that information. For example, any MRC 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular MRC product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
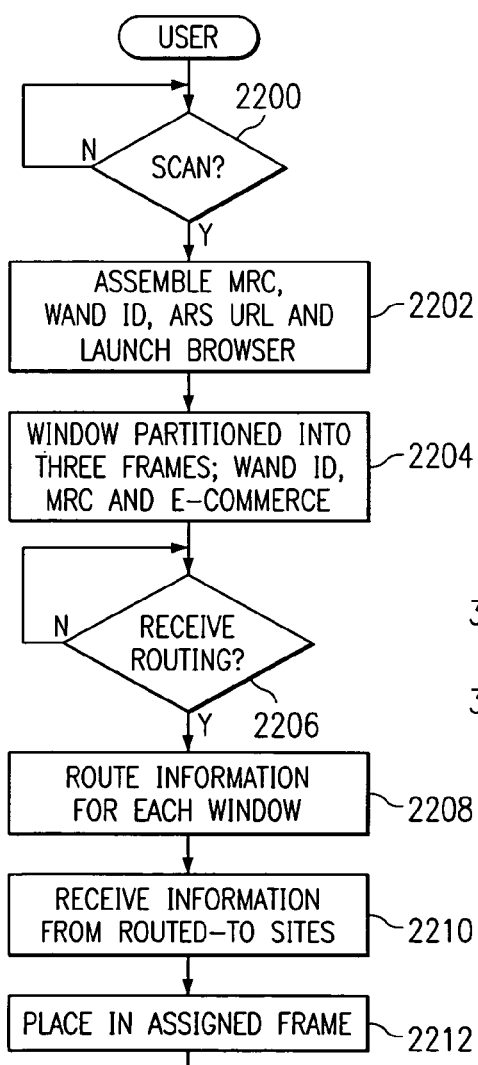
FIG. 22 illustrates a flowchart of the process of receiving information for the user's perspective.

Referring now to FIG. 22, there is illustrated a flowchart of the process of receiving information from the user's perspective, and according to the disclosed embodiment. The wand software running on the user's PC 302 runs in the background until activated by output from the wand 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the wand software assembles a message packet containing the MRC information, the wand ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the wand distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the wand software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to wand distributor information, and possibly other advertisements based upon the user's profile.

Referring now to FIG. 23, there is illustrated a flowchart of the process according to the ARS. The ARS 308 is operable to decode and process messages received from the GCN 306. Therefore, flow is to a decision block 2300 where, if MRC information is not received, flow is out the "N" path with loop-back to its input. If MRC information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the wand ID 1804 is compared with the list of wand IDs issued by the particular wand distributor. If the wand ID 1804 is validated, flow moves out the "Y" path to a function block 2308 where the message packet is appended with the wand ID 1804 and distributor routing address. Flow then moves to a decision block 2310 where the ARS 308 determines if any E-commerce information is to be associated with a particular wand ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the wand ID 1804 is determined to be invalid, flow moves out the "N" path and jumps forward to the input of decision block 2314, since the lack of a wand ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the MRC information, the distributor server 1616 address and wand ID 1804 information.

Referring now to FIG. 24, there is illustrated a flowchart of the process performed at the E-commerce site. The E-commerce server 1618 receives the message packet from the user PC 302, as indicated in function block 2400, and decodes the packet to perform a match with the MRC information. Moving on to a decision block 2402, if the match is unsuccessful, flow is out the "N" path to a function block 2404 where the match is rejected. A message may be returned to indicate that a problem occurred and the user may need to re-scan the product MRC 1606. If a successful match occurs, flow moves out the "Y" path to a function block 2406 where the wand ID 1804 is matched with the MRC product information. The MRC information may be distributed to customers over a large geographic area. However, the wand 1606 may be coded for certain geographic areas. For example, a wand 1600 having an XXX ID may be restricted for sale in the Southwestern United States while a wand 1600 having a YYY ID may be sold only in the Northeast. In this way, geographic areas may be targeted with advertising more appealing to that particular area. Advertising returned to the user PC 302 may be focused further by obtaining a user profile when the software or wand 1600 are installed. In this way, advertising may be focused based upon the user profile. Therefore, flow moves to a function block 2408 to lookup the E-commerce action based upon the wand ID 1804 and the MRC information. Flow moves to a function block 2410 to assemble all the information into a packet for return to the user PC 302. The product information and/or user profile information may be returned. Flow is then to a function block 2412 where the message packet is transmitted.

Automatic Configuration of Computer Equipment

The disclosed architecture has application in a number of systems. For example, in a first category of novel embodiments, the automatic configuration architecture can be applied to computers and computer-related peripherals. In a second category of novel embodiments, the architecture can be applied to non-computer-related equipment, for example, test equipment, network equipment, and scientific instruments, i.e., any network appliance other than a personal computer. Notably, that although the disclosed novel embodiments are discussed in the context of packet-switched networks, application also pertains to connections over circuit-switched networks such as the Public Switched Telephone Network (PSTN). With the proliferation of smart paging devices and cellular telephones, automatic configuration of such devices can also be obtained over the PSTN using the disclosed novel aspects.

Referring now to FIG. 25, there is illustrated a system block diagram of a preferred embodiment. The configuration process includes requesting any one or more of the following configuration information: device driver software for facilitating operation of hardware with an application and/or system, firmware software for providing the basic input/output system code for a piece of hardware, software updates for a specific software application, and operating mode information for setting the hardware in a specific mode of operation. Note that any other data which facilitates implementation, operation and control of a hardware and/or software component can also be included for use with the disclosed novel architecture. Notification to the user of the availability of the configuration information is provided in any of a number of formats, for example, a document 1602 having a text portion 1604 understandable by the user and describing the particular type of configuration information and computer module to which it refers may apply, and one or more machine-resolvable codes 1606 (e.g., an MRC 1606 having an embedded transaction code in the format of any of a number of recognized formats such as UPC, EAN, ISBN, etc.) associated with the particular configuration information and located on the document 1602 which are scanable or readable by the wand 1600.

The system is substantially similar in operation to the system of FIG. 16 hereinabove, in that the wand 1600 connects to the interface unit 1608 which in turn connects to the keyboard port of the user PC 302. The interface 1608 converts data from the wand 1600 into keyboard-compatible protocols which are then transmitted to the PC 302 via the keyboard port. When the wand 1600 is not in use, input from the keyboard 1610 is passed through the interface 1608 unconverted and into the keyboard port of the PC 302. The document media 1602 containing the MRC 1606 can be provided to the user in many different forms, for example, in the form of advertisements in newspapers, flyers submitted in the mail, or any kind of documentation or printable files which can be provided to the user of the user PC 302. MRCs 1606 are also attached to hardware and/or printed on the hardware for easy tracking. Numerous internal computer components are marked with an MRC 1606, for example, memory modules, hard drives, motherboards, adaptor cards, power supplies, CDROM drives, processors, etc. Similarly, many external peripherals are also distributed with attached MRCs 1606, for example, printers, sheet scanners, modems, PCMCIA devices, routers, hubs, external drives (CD-ROMs, hard drives, optical drives, etc.) and a whole host of other devices not mentioned here. The MRC, in one aspect of the disclosed embodiment, is a unique code that has no apparent relationship with the article to which it is attached (as to the configuration operation described herein), the relationship contained in a relational database, as will be described hereinbelow.

Upon scanning of the MRC 1606 with the wand 1600, the encoded transaction information is received into the interface 1608 and appended with routing information, which routing information contains the network address of an intermediate node on the GCN 306. In accordance with the network address, the transaction code information and other data are then assembled into a message packet for ultimate transmission to the remote intermediary site on the GCN 306.

In this particular scenario, the intermediate node or location is designated as a vendor reference server (VRS) 2500. The VRS 2500 is substantially similar to the ARS 308 mentioned hereinabove, in that the VRS 2500 contains most of the same information, and more (e.g., user profile information), and which in some embodiments, may require a substantially more complex database to track additional information associated with the disclosed embodiments. The VRS 2500 has associated with it a VRS database 2502, a relational database, for storing the database which will be discussed in greater detail hereinbelow. Therefore, when the user scans the MRC 1606 with the wand 1600, a data packet is ultimately assembled with appended routing information such that the user PC 302 directs transmission of the data packet through the interface 304 (e.g., a modem or router) across the GCN 306 to the VRS 2500. At the VRS 2500, a lookup operation in a relational database is performed such that any one of a number of matching operations can occur to obtain a network address of a vendor web server (VWS) 2504. In one embodiment, the transaction code is used to obtain the network address of the VWS 2504. The parameters which are transmitted from the user PC 302 to the intermediary VRS 2500 will be discussed in greater detail hereinbelow.

Upon determining the network address of the associated VWS 2504, a data packet is assembled by the VRS 2500 containing the network address of the VWS 2504, in addition to other data, such as the transaction code, user profile information, etc. The data packet is transmitted back to the user PC 302, which then transmits the associated information in the form of the transaction code, etc., to the VWS 2504 utilizing the network address from the VRS 2500, where the requested configuration information indicated by the transaction code of the MRC 1606 is returned to the user PC 302 and installed on either the user PC and/or the hardware peripheral. Therefore, upon the user deciding to scan the MRC 1606 with the wand 1600, configuration information is returned from the network-based VWS 2504 back to the user PC 302 and installed. As indicated in FIG. 25, there can be more than a single VWS 2505 to which the lookup operation at the VRS 2500 is associated. For example, a second vendor web server (VWS$_2$) 2508 having its respective VWS$_2$ database 2510 can be linked to the transaction code in the VRS database 2502, or linked through the VWS 2504 to one or more other vendor servers when the requested configuration information is not available on the VWS 2504. Notably, the VRS 2500 and associated VRS database 2502 are substantially similar to the ARS 308 and its ARS database 310 in both structure and function. Similarly, the VWS 2504 and its VWS database 2506 are substantially similar to the advertiser server 312 and its database of information (not shown in FIG. 16).

Referring now to FIG. 26, there is illustrated a flowchart of the general automatic configuration process which occurs using the system of FIG. 25. Flow begins at a Start block and moves to a function block 2600 where the user scans the MRC 1606 with the wand 1600, the MRC 1606 having encoded therein a transaction code that is associated with the particular configuration information of a computer component (hardware or software). Flow then is to a function block 2602 where a message packet is assembled at the user PC 302 for ultimate transmission across the GCN 306 to the VRS 2500 containing the transaction code (after extraction from the MRC 1606). Flow is then to a function block 2604 where routing information associated with the intermediate VRS 2500 is appended to the assembled data packet by the interface 1608. Flow continues to a function block 2606 where the total data packet, including routing information, is inserted into a network communication program which runs in the background of the operating system (OS) of PC 302 (or in the foreground, in an alternate embodiment).

The network communication package then transmits the data packet to the VRS 2500 in accordance with the routing information, as indicated in a function block 2608. Flow is then to a function block 2610 where a lookup operation is performed at the VRS 2500 in order to obtain the address of the VWS 2504. The lookup operation uses the transaction code information as a parameter or a pointer to find the appropriate network server address in the database 2502 from which to access the relevant configuration information. Flow is then to a function block 2612 where a connection is made from the VRS 2500 across the GCN 306 to the VWS 2504 in accordance with the intermediate data packet information assembled at VRS 2500 and returned to the user PC 302, and in response to the scanning of the MRC 1606. Flow is then to a function block 2614 where the configuration information associated with the transaction code contained in the data packet received from the user PC 302 is then obtained from the VWS database 2506. Flow is then to a function block 2616 where the configuration information is then transmitted back to the user PC 302 from the VWS 2504, and installed, as indicated in a function block 2618. Flow is then to a Stop block where the automatic configuration process ends. The process disclosed hereinabove operates with the VRS database 2502 storing all of the pertinent user profile information in order to facilitate automatic retrieval and configuration using the configuration information. In an alternative embodiment discussed hereinbelow, the VRS database 2502 contains only that amount of information necessary to link the user PC 302 to the VWS 2504. Therefore, more information about the user PC 302 and hardware/software which needs to be configured, is transmitted in the message packet from the user PC 302 to the VWS 2504 in order to retrieve the desired configuration information.

Figure 27A:
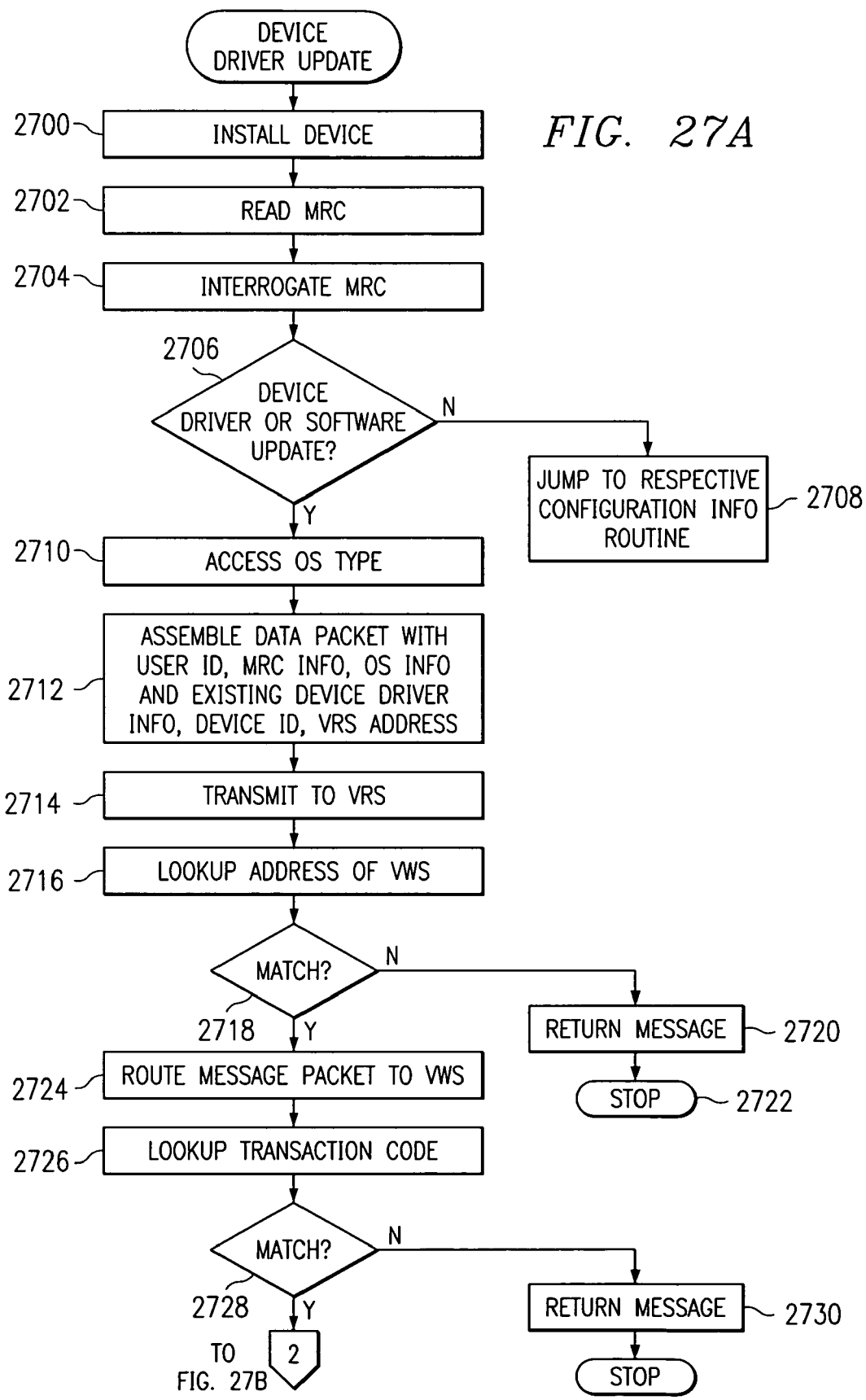
FIGS. 27A and 27B illustrate a flowchart for the process for obtaining configuration information related to a device driver update and/or software application update where user PC and hardware/software data is transmitted from the user PC.
Figure 27B:
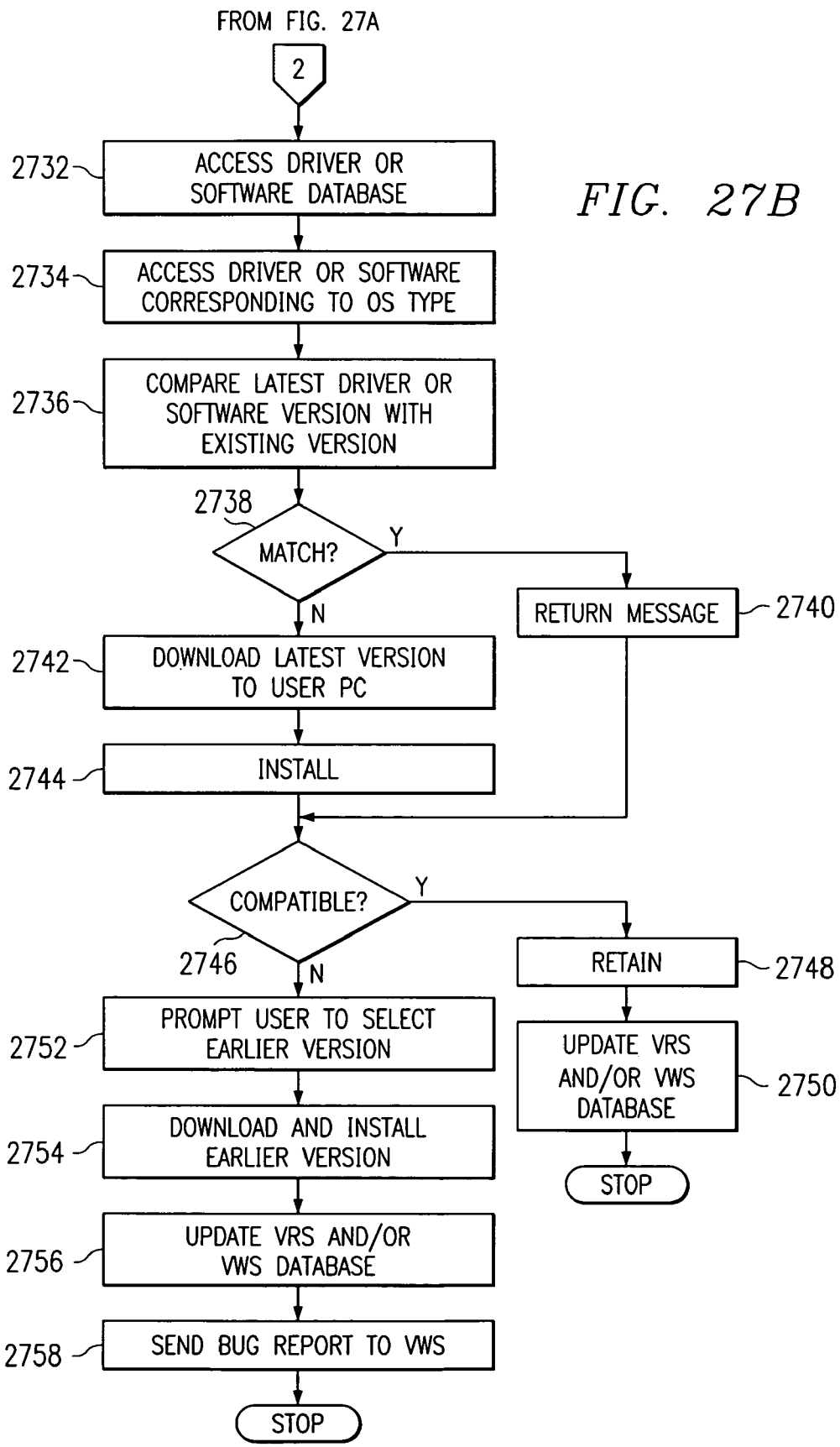

Referring now to FIGS. 27A and 27B, there is illustrated a flowchart of a more detailed process for obtaining configuration information related to a device driver update and/or software application update where user PC 302 and hardware/software data is transmitted from the user PC 302. This particular flowchart describes a process whereby user profile information is not stored in the VRS database 2502, and which requires that certain system information about the user PC 302 or peripheral be transmitted along with the transaction code in order to obtain the correct configuration information for the user PC 302 or peripheral. Flow begins at a function block 2700 where the user installs a particular device or component into the user PC 302. Flow is then to a function block 2702 where the user has, at one point or another, received a document having the MRC 1606 and readable text 1604 which informs the user of an available driver update associated with the particular installed device, or the product itself having the attached or imprinted MRC 1606. (Note that the MRC 1606 may be attached to the hardware component itself.) The user then scans the MRC 1606 with the wand 1600 to initiate the process of automatically receiving the device driver from the remote VWS 2504. (Notably, where provided, the user could manually enter the transaction code number printed in proximate to the MRC 1606 using the keyboard 1608 instead of using the wand 1600.)

Flow is then to a function block 2704 where the transaction code is interrogated before transmission to the VRS 2500 to make a preliminary determination as to whether the MRC 1606 is related to a request for updated device driver information, updated firmware information, operating mode information, or a software application update. The preliminary interrogation of the transaction code is required since, in some cases certain additional system information is required in order to obtain the correct device driver. For example, device drivers are specific to particular operating systems, therefore the message packet, in this particular embodiment, includes data indicating which operation system the user PC 302 is running. Note that where the user profile is stored on the VRS database 2505, this information can also be obtained later at the VRS 2500, and does not have to be made at the user PC 302.

Flow is then to a decision block 2706 where a determination is made as to whether the configuration information of the interrogated MRC 1606 relates to a device driver or software application update. This determination process is made since existing OS information is also required to obtain the correct driver software or software update. If the MRC 1606 is not related to a device driver or software update transaction code, flow is out the "N" path to a function block 2708 where program flow jumps to a corresponding routine for implementing the remaining firmware update or operating mode routine. On the other hand, if the interrogated MRC 1606 is associated with the user requesting an updated device driver or software application update, flow is out the "Y" path to a function block 2710 where the type of OS running on the user PC 302 needs to be determined to retrieve the appropriate software. For example, if the user PC 302 is running the Windows 98® OS, that information needs to be known to prevent the download of an incompatible driver for use with the Apple® OS, or a UNIX OS. Similarly, such OS information is required to properly update the desired software application.

Flow is then to a function block 2712 where a data packet is assembled having, for example, a user ID (which can be used for ultimately identifying the location of the user PC 302 on the GCN 306), transaction code information, OS information, existing device driver information (or software version information, in the case of updating a software application), a device ID (to properly identify the existing device in the user PC 302 for which the user wants the updated information), and appended VRS 2500 routing information (to provide the network address of the VRS 2500). Note that the assembled data packet need not have this much information or it may have more information, depending upon the particular goals to be attained with the disclosed architecture. The VWS 2504 may obtain information at a later time after connection is made between the user PC 302 and the VWS 2504. Flow is then to a function block 2714 where the assembled data packet is transmitted to the VRS 2500. At the VRS 2500, a lookup process using the transaction code information attempts to retrieve an associated network address of the VWS 2504 from the database 2502, as indicated in the function block 2716. Flow is then to a decision block 2718 to determine if a match has been made. If not, flow is out the "N" path to a function block 2720 where a message is returned to the user indicating that a match has not occurred and that other steps must be taken to complete the update and/or configuration operation. Flow is then to a Stop block 2722.

On the other hand, if a match has occurred in decision block 2718, flow is out the "Y" path to a function block 2724 where a second message packet containing the matched network address, user profile information for identifying user, and transaction code is assembled and routed to the user PC 302, and then to the VWS 2504. Note that at this point the VRS database 2502 may contain network addresses for a number of VWS 2504 servers where a plurality of vendors may provide drivers for a particular device. For example, a graphics adaptor manufacturer may contract with a popular manufacturer of a graphics processor to supply a large number of its particular graphics processors for that particular graphics adaptor. In this scenario, the vendor of the graphics processor may write driver updates for that processor, in addition to the vendor who is selling the particular graphics card writing its own set of drivers. Therefore, the installed device or card may have more than one source of different device drivers. In this scenario, the user may be prompted through a software interface, and after first accessing the VRS 2500 during initial setup and entry of user profile information, to select from one or more of the source vendors for a particular device driver update. Alternatively, the user may specify from which vendor of a number of vendors that he or she may want the update to be obtained. This vendor selection will then be contained in the user profile which is stored on the VRS database 2502.

Flow is then to a function block 2726 where, upon receiving the second message packet from the VRS 2500 at the VWS 2504 via the user PC 302, another lookup operation at the VWS 2504 is performed to associate the scanned transaction code with the device driver or software update information stored on the VWS database 2506. (Alternatively, the associated address of the VWS 2504 may include the complete URL path which would then forego the need for another lookup operation at the VWS 2504.) This first vendor lookup may narrow the search of device drivers to a particular device model. Flow is then to a decision block 2728 to determine if a match has occurred. If not, flow is out the "N" path to a function block 2730 where a message is returned to the user to take other action. Flow is then to a Stop point. If a match has occurred, flow is out the "Y" path of decision block 2728 to a function block 2732 to access the driver database located on the VWS database 2506. Flow is then to a function block 2734 where the OS of the user PC 302 is used to further define which particular driver from the driver database will be returned to the user. Flow is then to a function block 2736 where a comparison of the existing driver information (obtained from the user PC 302) with the latest driver version information contained within the VWS database 2506, is made. Flow is then to a decision block 2738 where, if a match has occurred, flow is out the "Y" path to a function block 2740 where a message is returned to the user indicating that the user has the latest version of device driver, and that no download is required.

In a feature benefitting a troubleshooting function, or to correct the install of an error-inducing ("buggy") or incompatible driver, the user may also, at this time, be prompted by the VWS 2504 to affirmatively select to have the updated information downloaded and installed or the user may deny the request. Furthermore, the user may selectively enable installation of a previous version to bring the PC 302 back to stable operation from the installation of a new and buggy updated driver. On the other hand, if the match has not occurred, indicating that the user does not have the latest driver software installed on the user PC 302, flow is out "N" path to a function block 2742 where the latest driver is then retrieved from the VWS database 2506 (or alternative linked source) and downloaded to the user PC 302. Flow is then to a function block 2744 where the latest driver information is installed on the user PC 302, which installation typically involves loading the software and then rebooting the user PC 302 to enable execution of the update to verify that the update is compatible with the particular user PC 302 system. In either case of the user not having the latest updated driver information or having the latest updated driver information, flow is from function block 2744 and from function block 2740 to the input of a decision block 2746 to determine if the present drivers are operating properly with the user PC 302. If so, flow is out the "Y" path to a function block 2748 where the driver is retained as an installed driver on the user PC 302. At this point, flow is to a function block 2750 where the user has updated the device driver or already had the latest device driver installed; this configuration information can optionally be used to update the VRS database 2502 and/or the VWS database 2506, whichever database is determined to be that which records the user information (if this disclosed database function is introduced into the particular user application). Flow is then to a stopping point.

On the other hand, if it is determined that the latest downloaded and installed driver is incompatible or buggy, flow is out the "N" path to a function block 2752 where the user may be prompted to go back to an earlier device driver that is compatible with the user PC 302. This incompatibility issue is determined by the user PC 302 being rebooted after installation and typically becomes apparent to the user through the presentation of one or more error messages or device failures. At this point, the user may request that the earlier or prior version that was recently overwritten during the latest install process be reinstalled, since that device driver most likely was compatible with the user PC 302. It can be appreciated that, in more sophisticated scenarios, the user may be presented with a menu where he or she may select from a variety of versions of device drivers which may be installed on the user PC 302 for various reasons including technical troubleshooting of the user PC 302. Flow is then to a function block 2754 where the user downloads and installs the selected device driver version from the VWS 2504. Flow is then to a function block 2756 where the VRS database 2502 and/or the VWS database 2506 are updated with the relevant information regarding the user and the particular device driver installed on the user PC 302 (if this optional feature is provided). Flow is then to a function block 2758 where a bug report could be forwarded to the VWS 2504 indicating that the attempt to load the latest device driver for the particular device failed on this user PC 302. Transmission of the bug report back to the VWS 2504 is beneficial in that the vendor can expeditiously obtain feedback on the quality of device drivers provided for the particular device, and perhaps communicate with the user of the user PC 302 via email to more accurately ascertain the problems associated with the device driver. Flow is then to a stopping point.

Figure 28A:
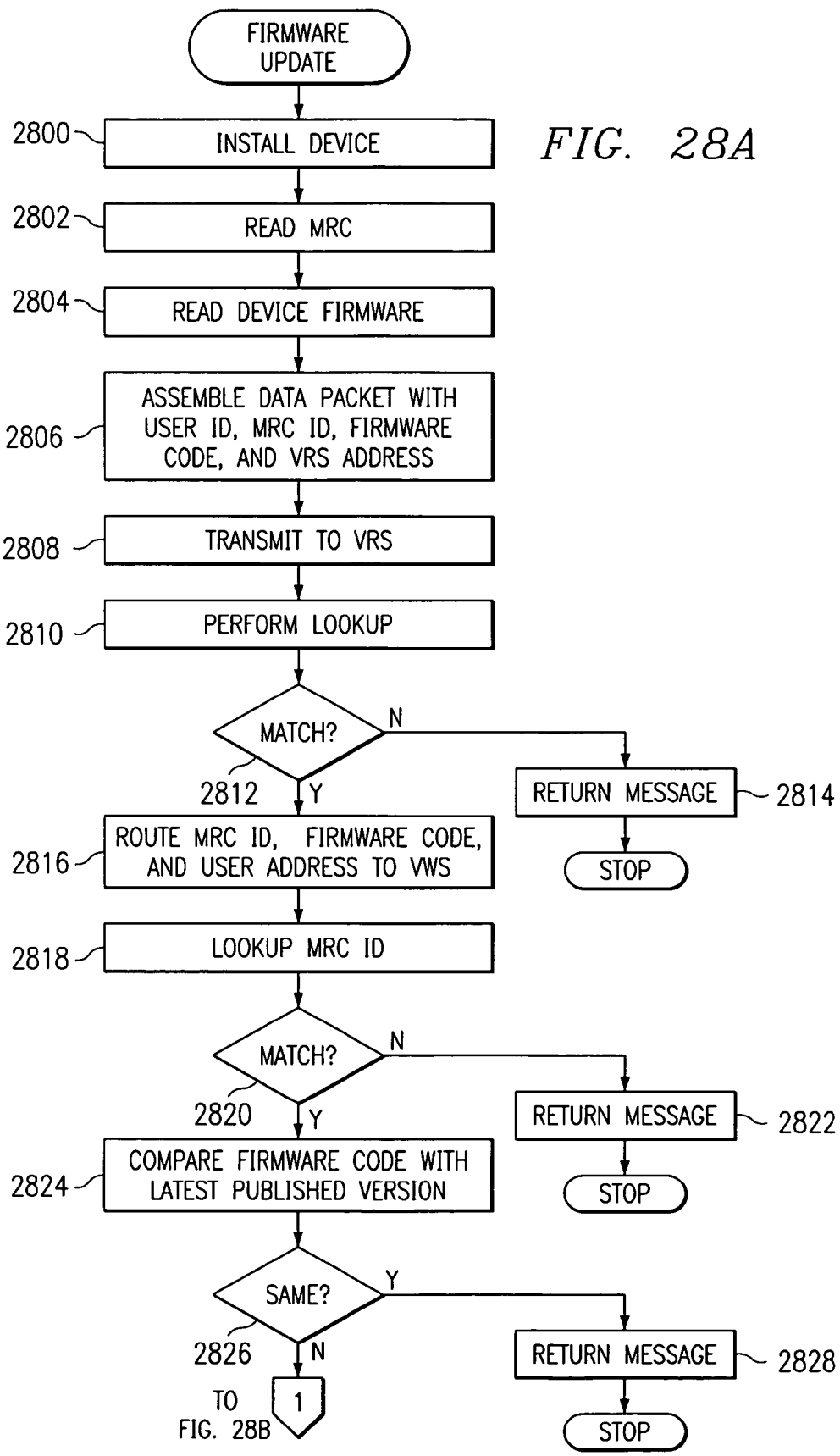

Referring now to FIGS. 28A and 28B, there is illustrated a flowchart for the process for obtaining a firmware update by scanning an MRC 1606 of a document, in response to which several pieces of information are transmitted for the user PC 302. Flow begins where the user installs the device, component or module which requires the firmware update, into the user PC 302, as illustrated in a function block 2800. Flow is then to a function block 2802 where the user scans the MRC 1606 of the document 1602 with a wand 1600. (As noted hereinabove, the MRC 1606 may also be scanned from the product or component, itself.) Flow is then to a function block 2804 where the existing device firmware version of the recently-installed device is determined. This determination can be made by the user simply viewing and recording the firmware version information as it is displayed during boot-up of the PC 302, or in a more sophisticated manner by providing a software algorithm that reads the device firmware version. Flow is then to a function block 2806 where a data packet is assembled having the MRC transaction code firmware version information and an appended routing address associated with the VRS 2500. Also included in the data packet is the source address which identifies the source or node location on the GCN 306 of the user PC 302, and which facilitates return of any information back to the user PC 302. Also included is a user ID that is unique to the user and associated with user profile information in the database 2502. Flow is then to a function block 2808 where the assembled data packet is transmitted to the intermediate node location (which is the VRS 2500) according to the VRS address appended to the data packet. Flow is then to a function block 2810 where a lookup operation is commenced with data in the VRS database 2502 to match the transaction code with an associated address of the VWS 2504.

Flow is then to a decision block 2812 where, if a match does not occur, flow is out the "N" path to a function block 2814 where a message is returned to the user indicating that a match has not occurred, and possibly either firmware update information does not exist for the particular device or perhaps problems have occurred which require the user to take alternative steps to receive the updated information. Flow is then to a Stop block. On the other hand, if a match has occurred, flow is out the "Y" path to a function block 2816 where the address of the VWS 2504 is retrieved from the VRS database 2502 and appended to another message packet being assembled for transmission to the VWS 2504 via the user PC 302 and having the transaction information and existing firmware version code in use by the device on the user PC 302. This message packet is then used to connect to the VWS 2504 via the user PC 302 where another lookup operation is performed to match portions of the transaction code with the particular firmware database to obtain the latest firmware version information, as indicated in a function block 2818. (Alternatively, as noted hereinabove, the VRS database 2502 may contain the network address and full data path to location of the firmware file foregoing the need for an additional lookup operation at the VWS 2504. However, the transaction code and user profile information may still be required for the configuration/update.) Flow is then to a decision block 2820, and if a match has not occurred, flow is out the "N" path to a function block 2822 where a message is returned to the user from the VWS 2504 indicating that perhaps no updated information exists or an error has occurred which requires the user to, for example, re-scan the MRC 1606. Flow is then to a stopping point.

On the other hand, if there is a successful match with the MRC transaction information in the VWS database 2506, flow is out the "Y" path to a function block 2824 to compare the existing firmware version of the installed device in the user PC 302 with the firmware version retrieved from the VWS database 2506. Flow is then to a decision block 2826 where if the versions are the same, flow is out the "Y" path to a function block 2828 to return a message to the user to the effect that the user has the latest version and that no upgrade process will commence. Flow is then to a stopping point. On the other hand, if a match does not occur (indicating that the user does not have the latest version of firmware), flow is out the "N" path of decision block 2826 to a function block 2830 to download the latest firmware code to the user PC 302. Flow is then to a function block 2832 where the latest firmware is then installed on the user PC 302, which may be installed at the discretion of the user. In this case, the user may be prompted via a software window offering a variety of options to the user to, for example, perform the installation at a later time or to go ahead with the installation at this particular time. The user may also be provided the option of installing a version earlier than the existing software for the purposes of troubleshooting. In many cases, installing the latest firmware can result in errors or incompatibilities with existing system components or drivers currently residing on the user PC 302. In this case the user may choose to uninstall the latest firmware version to place the user PC 302 back in an operable condition such that the user can use the user PC 302 for its intended purposes.

After the software has been installed, the PC 302 is typically required to be restarted. If any incompatibility issues or errors occur due to installation of the latest firmware code, the PC 302 will usually indicate such problems after the reboot cycle. Therefore, flow is then to a decision block 2834 to determine if the latest firmware version is compatible with the system of the user PC 302. If the latest firmware install is compatible, flow is out the "Y" path of decision block 2834 to a function block 2836 where the latest firmware download will be retained on the user PC 302. Flow is then to a function block 2838 where in one scenario, as mentioned hereinabove, the VRS database 2502 and/or the VWS database 2506 may be updated with the user information such that any subsequent update requests to update firmware can be expedited simply by checking the respective database (2502 and/or 2506) against the latest published firmware versions at the VWS 2504. Similarly with this updated information residing in the VRS database 2502, a request by the user to check for the latest firmware updates can be resolved at the VRS 2500 instead of connecting to the VWS 2504 to perform the matching and lookup operation.

As indicated hereinabove, if the latest installed firmware version is incompatible, flow is out the "N" path of decision block 2834 to a function block 2840 where the user can then be offered the option of uninstalling the recently-installed code and selecting the previous installed version of firmware to put the user PC and the associated device which operates using the firmware code, back in an operable and error free condition. It can be appreciated that the user may choose to select a version of firmware that is prior to the previous version of firmware, wherein this selection can be used to troubleshoot or to test various aspects of the device or user PC 302. Flow is then to a function block 2844 where the update process of either one or both of the databases VRS 2502 or VWS 2506 may occur such that any subsequent requests for updates can be facilitated or expedited at the database level. Flow is then to function block 2846 where a bug report can then be sent to the VWS 2504 to closely track compatibility issues with the latest issued firmware version. As indicated hereinabove, these bug reports can then facilitate communication via e-mail to the user who attempted to install the latest firmware in order to ascertain what the problems with the installation may have been. Flow is then to a Stop block 2848 where the process ends.

Referring now to FIG. 29, there is illustrated an alternative embodiment where the MRC code containing the transaction information is located on the computer component or peripheral itself. In this particular embodiment, the user scans an MRC 2900 (similar to MRC 1606) located on the component, which may be, for example, a graphics adapter card 2902. The MRC information contains, as described hereinabove, a unique code that is associated with the model number of the particular component 2902, such that a message packet is assembled with this unique and appended routing information directing transmission of the data packet across the GCN 306 to the VRS 2500. A matching operation using the unique code is then performed at the VRS 2500 using the VRS database 2502 to obtain the network address of the associated VWS 2504. Information relevant to the version of the latest firmware or device drivers are then obtained from the VWS database 2506, as described hereinabove, and returned to the user PC 302 to inform the user of the latest versions of both the firmware and device drivers, and for automatic or optional install.

In a second scenario, the scanned transaction information is temporarily stored on the user PC such that after the user scans the MRC 2900 of the adaptor 2902, and prior to installation of the adapter 2902 in the PC 302, the MRC information is stored in the user PC 302 prior to transmission to the VRS 2500. The user then powers down the PC 302, installs the device 2902, and powers up the PC 302, at which time the communication package running on the PC 302 transmits the MRC information and other associated user and/or device ID information across the GCN 306 to the VRS 2500. The latest updates can then be obtained from the VWS 2504, as described hereinabove, and returned to the user PC 302 for installation.

It can be appreciated that in an alternative embodiment, after the user initially scans the MRC 2900 of the uninstalled adapter card 2902, but prior to powering down the PC 302, the software retrieval process has already begun whereby the retrieval process downloads to a queue a variety of software updates for the particular model of scanned adaptor 2902. For example, instead of waiting until after boot-up of the PC 302 in order to read the existing version of software (firmware and driver) so as to retrieve the appropriate file or files, the retrieval process commences immediately to return all of the software files for the most widely used operating systems (e.g., Window 95®, Window 98®, Windows 2000®, Linux®, and Apple®). Upon boot-up, the user then has all of the necessary downloaded software information waiting in a queue which is more quickly accessible.

The component or device 2902 also has associated with it a CPU 2904 for controlling operations on the device adaptor 2902, an ID chip 2906 which contains a hard-coded unique ID for the device 2902, and a non-volatile memory 2908 which contains the firmware (i.e., Basic Input/Output System—BIOS) for the device 2902. The firmware is a software code which is stored within the non-volatile memory 2908 for execution and handshaking with the PC 302 operating system during power-up sequence of the PC 302. In one or more embodiments mentioned hereinabove, the non-volatile memory 2908 is read along with the unique ID 2906 and assembled into the data packet for transmission to the VRS 2500. As will be discussed in greater detail hereinbelow, the unique ID 2906 may be entered into one or more databases which maintain a user profile associated with the various components installed in the user PC 302. Additionally, the wand 1600 is identified by a unique ID which may also be downloaded and stored in, for example, the VRS database 2502 and/or the VWS database 2506, or an auxiliary database (not shown). It can be appreciated that a particular software application in operation on PC 302 can retrieve a variety of parameters and unique ID information which can be ultimately stored in association with the user profile on the VRS database 2502 or other databases, as desired.

Referring now to FIGS. 30A and 30B, there is illustrated a flowchart of an alternative embodiment where a computer component or peripheral is automatically interrogated after installation and power-up in the user PC 302 without scanning of the attached MRC. (Note that with some of the more recent technologies such as Universal Serial Bus (USB), the peripheral can be connected to the PC 302 while the PC 302 is in its powered state.) Flow begins at a Start block and continues to a function block 3000 where the user installs the device or adapter 2902 into the user PC 302. The user then powers up the user PC 302, as indicated in the function block 3002. Flow is then to a function block 3004 where the resident operating system (OS) detects the installed device 2902 and the OS responds by loading an available driver (not necessarily the desired manufacturer's driver) for the particular device 2902, as indicated in a function block 3006. Alternatively, the user could be prompted to install the driver that was provided by the manufacturer on distribution media (e.g., diskettes or a CD), and that typically comes with the new device or peripheral 2902. However, it is conceivable that the accompanying device driver may still not be the latest as provided by the vendor of the device 2902.

Flow is then to a function block 3008 where the OS completes or nears completion of the boot-up process, and the firmware ID and driver ID of the device are then known, as indicated in function block 3010. It should be noted, that in function block 3004 the detection operation merely detects the model of device and not necessarily the firmware versions or driver versions. In this way, the OS can load a generally compatible driver for the detected device model to bring the device in a general state of operation prior to installation of the driver designed by the vendor for operation with the device 2902. Flow is then to a function block 3012 where a data packet is assembled having the OS type, the device ID, firmware ID, user ID source address (to identify the network location from which the information is being sent), and appended routing information (related to the network location of the VRS 2500). Notably, other information may be transmitted in the assembled data packet, or as will be discussed in greater detail hereinbelow, less information can be provided to achieve the desired results. Flow is then to a function block 3014 where the assembled data packet is transmitted to the VRS 2500 across the GCN 306.

Flow is then to a function block 3016 where a lookup operation is performed to match information regarding the installed device 2902 with information in the database 2502 related to the network address of its respective vendor web server VWS 2504. Flow is then to a decision block 3018 to determine if a match has occurred, and if not, flow is out the "N" path to a function block 3020 where a message is returned to the user indicating that user needs to take alternative steps to complete the update operation or perhaps to terminate the update operation. Flow is then to a Stop point. On the other hand, if a match has occurred, flow is out the "Y" path of decision path 3018 to a function block 3022 where a second data packet is assembled and transmitted to the network address retrieved from the lookup operation of the VRS database 2502 via the user PC 302. Flow is then to a function block 3024 where the data packet is received at the VWS 2504 and disassembled to obtain the MRC information containing the model of the device 2902 along with its associated firmware and drivers information currently in use by the device 2902 and the user PC 302.

The VWS database 2506 is then accessed using the model number contained in the scanned MRC 2900 to obtain the associated latest software firmware and drivers of the device 2902. In the case of the driver file, the OS of the PC 302 typically may need to be determined. For example, in some cases, a driver written for the Windows 98® operating system is different and incompatible with the Windows NT® or Windows 2000® operating systems. Therefore, the OS ID may also be used in a lookup operation to further define the specific driver needed for download. In other cases, a single device driver is written to be compatible with all of the Microsoft Windows® operating systems, and therefore, use of the OS ID is not required. Flow is then to a decision block 3026 to determine if the existing drivers transmitted from the user PC 302 are the latest drivers. If so, flow is out "Y" path to a function block 3028 where a message is returned to the user indicating essentially that no updates are required, or that no updates exist for the particular device 2902 that the user has installed. Flow is then to a function block 3030, where in an alternative embodiment, the VRS database 2502 is designed to maintain a user profile having update information, a database update operation is performed either with the VRS database 2502 (and/or the VWS database 2506 or an auxiliary server) to track the latest update activity of the user.

On the other hand, if the existing software drivers and firmware associated with the device 2902 are not the latest, flow is out the "N" path of decision block 3026 to a function block 3032 where the latest software drivers and firmware are downloaded and installed on the user PC 302 and associated device 2902. Flow is then to a decision block 3034 to determine compatibility of the latest software information with the user system. If the latest downloads are compatible, flow is out the "Y" path to the function block 3030 to perform the database update procedure (in the alternative embodiment of maintaining a user profile). On the other hand, if the recently installed software is not compatible with the user PC 302 and/or the device 202, flow is out the "N" path to a function block 3036 where the user is offered the option of selecting installation of the previous version of software, or perhaps for purposes of troubleshooting, an even earlier version of device drivers and/or firmware code. Flow is then to a function block 3038 where the earlier or previous versions of software are re-installed on the user PC. Flow is then to the function block 3030 where a database update process is optionally performed to track the user activity regarding updates for particular devices and systems associated with the user PC 302. Flow is then to a Stop block where the process ends.

Figure 31:
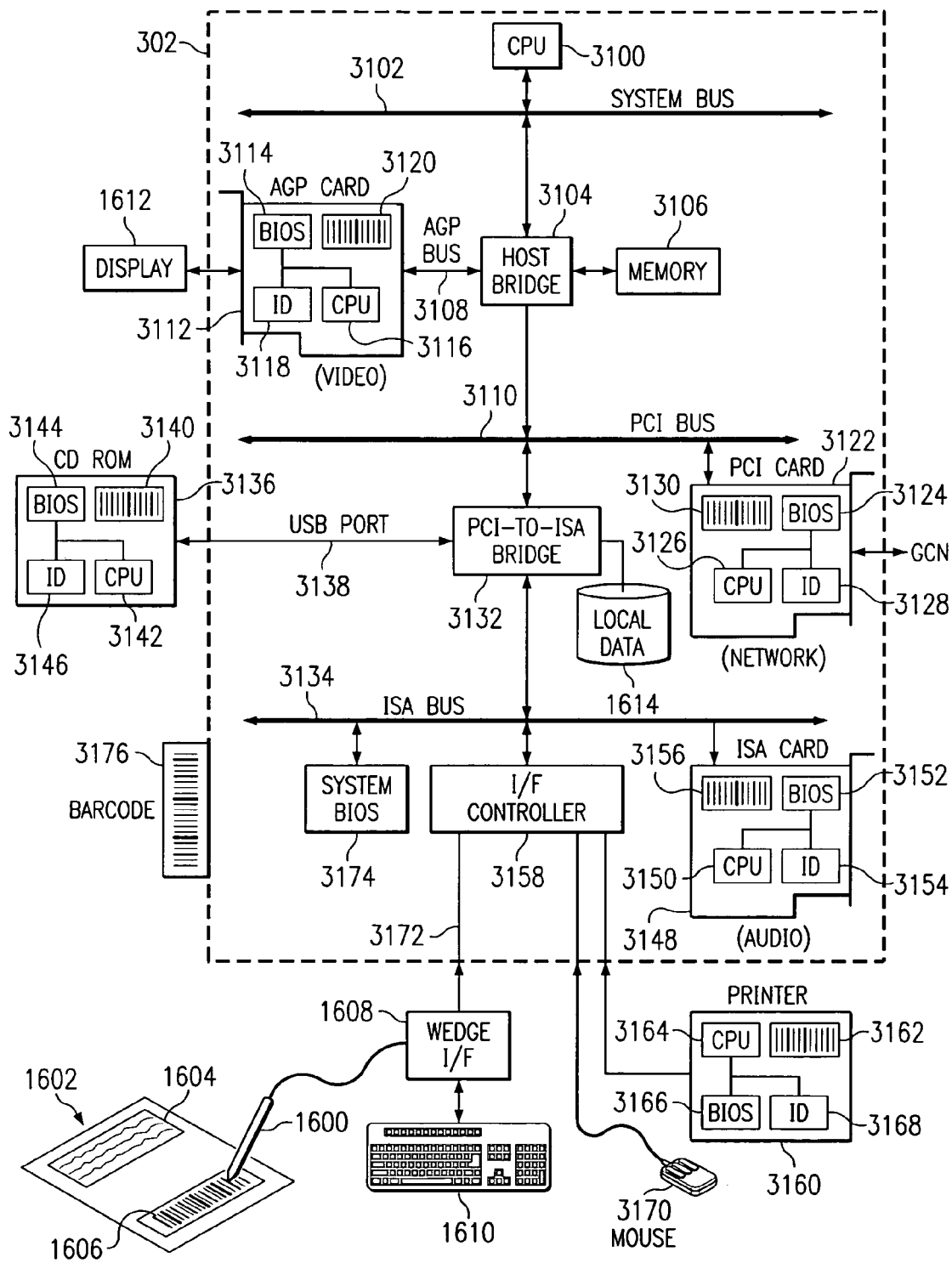
FIG. 31 illustrates a system block diagram of a conventional computer having an assortment of peripherals which operate according to the disclosed architecture.

Referring now to FIG. 31, there is illustrated a more detailed block diagram of a computer and associated peripherals operating according to a disclosed embodiment where the MRC contains transaction information related to a particular type of configuration. The PC 302 is a conventional computer configurable to operate with a number of peripherals and software programs. The PC 302 contains a CPU 3100 for processing of primary functions associated with general operation of the PC 302. The CPU interfaces to a high speed system bus 3102 which handles data, address and control signals between the CPU and a host bridge 3104. The host bridge 3104 provides a number of interfacing functions. The host bridge 3104 interfaces to a memory 3106 (e.g., SDRAM, DRAM, etc.), and provides connectivity to an Accelerated Graphics Port (AGP) bus 3108 for interaction with AGP devices, and generally provides an interface between a PCI bus 3110 and the system bus 3102. An example of an AGP device is an AGP card 3112 which performs a video processing function. In this particular embodiment, the AGP card 3112 provides the primary display functions for the display 1612.

The AGP card 3112 has, as mentioned in some detail hereinabove with respect to adaptor 2902 of FIG. 29, several onboard circuits which accommodate the disclosed architecture. For example, the AGP card 3112 comprises a non-volatile memory circuit 3114 which stores the BIOS software for the AGP card 3112, a CPU 3116 for processing of onboard video functions, and perhaps an ID chip 3118 which contains a hard-coded ID which uniquely identifies that particular AGP card 3112. (Another component of the video adaptor 3112 which is not shown typically includes high speed memory such as video RAM for facilitating the framing and presentation of video information on the display 1612 to the user.) The AGP card 3112 also has attached thereto an MRC 3120 (similar to MRCs 1606 and 2902) which the user can scan with the wand 1600 prior to installation of the AGP card 3112 into the PC 302. It can be appreciated that in an alternative scenario, during assembly of the PC 302 by, for example, a computer vendor or a computer-knowledgeable user, the computer chassis may be partially disassembled to expose the adaptor 3112 and its MRC 3120 while installed in the PC 302 such that the MRC 3120 may be scanned at this time by the wand 1600 while the adapter is powered, and initial configuration or troubleshooting of the PC system 302 can be made by a vendor technician or the computer-knowledgeable user.

The PCI bus 3110 has a number of compatible devices which can be connected thereto. For example, a PCI card 3122 (e.g., a network interface card) has onboard circuits similar to the AGP card 3112. For example, the network PCI card 3122 has onboard non-volatile memory 3124 which contains its respective BIOS code, an onboard CPU 3126 for handling processing operations of that particular PCI card 3122, and an ID circuit 3128 which contains a hard-coded ID which uniquely identifies that PCI card 3122. The PCI card 3122 connects to the PCI bus 3110 to handle all internal interface communications from the PC 302 to the GCN 306. Note that one or more of the onboard circuits of any of the mentioned cards 3122 and 3112 can have combined features such that the ID circuitry 3128 may be actually part of the CPU circuitry 3126 or similarly, the unique system ID may be encoded in the BIOS circuit 3124. The PCI card 3122 also has attached to it an MRC 3130 which the user can scan prior to installation of the PCI card 3122 into the PC 302 (or as mentioned hereinabove, while the PCI card 3122 is installed and the computer chassis open for access to scan the PCI card 3122). When the user scans the MRC 3130 with the wand 1600 prior to insertion of the PCI card 3122, the MRC information is stored in software on the local data storage unit 1614 for later use.

The PC 302 also comprises a PCI-to-ISA bridge ("PCI bridge") 3132 for interface communications between devices on the PCI bus 3110 and ISA bus 3134. The PCI bridge 3132 also provides interface to the local data storage drive 1614 and also any USB devices or peripherals which interface to the PC 302. For example, an external CD-ROM drive 3136, in this particular embodiment, connects to a USB port 3138 to facilitate the reading and recording of optical media. It can be appreciated that other USB-compatible devices may connect to this USB port 3138 to accommodate various functions desired by the user of PC 302. The CD-ROM 3136 has an MRC 3140 attached thereto, which according to features of the device MRCs mentioned hereinabove, contains, for example, a unique code associated with the model number and manufacturer of the CD-ROM Drive. The CD-ROM 3136 also has internal circuits similar to those of the adapter cards 3112 and 3122, such as a CPU 3142 for handling all onboard processing of the CD-ROM 3136, a non-volatile memory 3144 which contains BIOS code for operation of the CD-ROM 3136, and an ID circuit 3146 which contains an ID which is hard-coded into the circuit and is unique to the particular CD-ROM 3136. It can be appreciated that other USB devices such as keyboards, mice, hard disk drives, etc., can be connected to the one or more USB ports, each of which is identified by a unique ID and has an onboard processor and non-volatile memory which contains a software code executed by the onboard CPU during its operation.

The ISA bus 3134 facilitates the connection of ISA devices, in particular, an ISA card 3148, and communication for the ISA devices to other bus devices (e.g., AGP adapters, PCI adapters, memory 3106, CPU 3100, etc.) of the PC 302. Typically, the ISA card 3148 is a legacy device which contains similar features of the other cards and devices (AGP card 3112, PCI card 3122, and CD-ROM 3136), such as a CPU 3150 for handling all onboard processing, a non-volatile memory 3152 for storing onboard code which is executed by the CPU upon power up of the ISA card 3148, and an ID circuit which contains a hard-coded ID that is unique to this particular ISA card 3148. The ISA card 3148 also has attached thereto an MRC 3156 which can be scanned in the same manner as the other cards and devices mentioned hereinabove.

An interface controller 3158 interfaces to the ISA bus 3134 to accommodate connection of serial and parallel port devices. For example, a printer 3160 provides printing functions for the PC 302 and contains on its exterior, in most cases, an MRC 3162 which provides a unique code that identifies the particular model number of the printer 3160 or the model number itself. Internally, the printer 3160 also contains a CPU 3164 for handling all onboard processes, a non-volatile memory 3166 which stores software code which is executed by the CPU 3164 during operation of the printer 3160, and queued print jobs, and an ID circuit 3168 that contains a hard-coded ID which is unique to that particular printer 3160. It can be appreciated, that the printer may also be manufactured as a USB device and therefore can connect to the USB port 3138 for operation with the PC 302. The interface controller 3158 also provides an input for a serial device such as a mouse 3170 which may also comprise similar features (not shown) to the printer 3160 and other devices mentioned hereinabove. For example, the mouse may contain an ID circuit which provides a device ID unique to that particular mouse 3170, and a controller or processor which handles basic functions of the mouse 3170 during its operation. Similarly, the mouse may also be manufactured as a USB device which then connects to the USB port 3138 for operation. Attached to the bottom of the mouse (but not shown), can be an MRC which provides a unique code associated with the model number of the particular mouse, and therefore can be scanned with the wand 1600 to facilitate retrieval of update information associated with the particular mouse 3170. It can be appreciated that the mouse may also incorporate the MRC scanning function such that the mouse is passed over any of the mentioned MRCs for input of the MRC information to the PC 302. The mouse may also be an IRDA device such that no hardwire connection exists from the mouse 3170 to the PC 302 since the interface is by infrared transmission.

The interface controller 3158 also provides a keyboard input 3172 for interfacing to the keyboard 1610. In this particular embodiment, the wedge interface 1608 provides the intermediate connection for both the wand 1600 and the keyboard 1610 having output to the keyboard input port 3172 of the interface controller 3158. Note that the keyboard 1610 may also be an IRDA device such that no hardwire connection exists to the PC 302. In this case, communication is via infrared signaling thought an IRDA port (not shown).

In operation, the document 1602 provides readable text 1604 which the user of the PC 302 reads to interpret the purpose of the MRC 1606. For example, if the text 1604 were to indicate to the user that by scanning the MRC 1606 the transaction would involve obtaining the latest update information for the CD-ROM 3136 BIOS firmware, the user simply scans the MRC 1606 with the wand 1600 whose input into the PC 302 facilitates connection across the PCI bus 3110 through the PCI network card 3122 to the GCN 306 and intermediary node VRS server 2500. Also contained in that message packet, transmitted in response to the user scanning the MRC 1606, is unique information associated with the CD-ROM 3136 and possibly the unique ID contained in the ID circuit 3146, appended routing information which is the network address of the VRS 2500, a user ID and a source address of the user PC 302 which uniquely identifies the location of the PC 302 on the PCN network 306. Other data packet information may also be included as necessary to facilitate operation of the disclosed architecture, and will be discussed in greater detail hereinbelow.

Upon receipt of the message packet at the VRS 2500, a lookup operation is performed to determine the network address of the VWS 2504, in which the appropriate firmware and/or drivers are returned back to the PC 302 for installation in the CD-ROM 3136. Similarly, if the document 1602 were to contain text 1604 which describes the purpose of the MRC 1606 to facilitate updating the drivers and BIOS information of the AGP card 3112, the user may simply scan the MRC 1606 to trigger retrieval of the appropriate information from the remote vendor web server 2504 for purposes of installation and update on the PC 302 and AGP card 3112. Although not shown, the display 1612 and the keyboard 1610 may also comprise the necessary circuits (CPU, BIOS, and ID circuits) and associated MRCs to facilitate retrieval and updating of respective BIOS and drivers.

As mentioned hereinabove in one alternative embodiment, the automatic configuration update process may be triggered by simply inserting the devices into the PC 302 and providing power, which subsequently initiates identification and interrogation of the devices to determine if the existing drivers need to be updated by downloading and installing of the latest firmware and driver software from the VWS 2504. The PC 302 also contains a non-volatile memory 3174 that contains the system BIOS. The CPU 3100 executes the system BIOS contained in the non-volatile memory 3174 during power up of the PC 302, and such system BIOS can also be updated using the disclosed architecture and software described hereinabove for automatically detecting and updating the various components and cards associated with the PC 302. This process can be facilitated in a number of ways, for example, when the user obtains a motherboard (also called a system board) which includes the non-volatile memory 3174, the manufacturer of the motherboard can include an MRC label 3176 which could then be removed and placed on the outside of the computer chassis such that the user may periodically scan the MRC 3176 to facilitate or initiate the retrieval and installation of the latest software relevant to the motherboard BIOS stored in the non-volatile memory 3174. The motherboard MRC 3176 then contains a unique code associated with a model number of the particular motherboard and version number of the associated system BIOS. This information is then transmitted to in the same manner indicated hereinabove to retrieve the latest firmware updates or drivers required for the operating system to "recognize" the various features of the motherboard (e.g., ATA66 drive compatibility, high density floppy drives, etc.).

It can also be appreciated that scanning of a single MRC 1606 (on a document or the component) can initiate a general update call which initiates update of all related configuration information of the component. For example, as single scan of one MRC 1606 initiates automatic configuration of the component by downloading any of a combination of the firmware, device drivers, and control or interface software.

Referring now to FIGS. 32A and 32B, there is illustrated a number of variations of the VRS database structure, in accordance with the automatic configuration embodiments. In the most basic implementation, FIG. 32A illustrates the VRS database 2502 containing a transaction code field 3200, the user ID 1806, and VWS address field 3202. By scanning the MRC 1606, the message packet is assembled having the transaction code 3200, user ID 1806, and appended routing information (network address of the VRS 2500). When received at the VRS 2500, the message packet is disassembled such that the transaction code 3200 is extracted and used in a lookup operation to obtain the VWS network address 3202. A second packet is then assembled having the transaction code 3200, user ID, and appended VWS address 3202, which VWS network address 3202 is the full URL path to the file associated with the particular transaction code 3200, and then transmitted to the VWS 2504. Using the user ID, the configuration information is then downloaded to the user PC and installed. The VWS address 3200 may be in the form of an IP address (xxx.xxx.xxx.xxx) or a domain name (e.g., vendor.config.com) having associated therewith the full path information locate the configuration information.

In FIG. 32B, a more complex database structure is illustrated where the VRS database contains the user profile information. The VRS database 2502 contains the parameters of FIG. 32A, in addition to user profile information which contains various detailed information about the user PC 302 and its components. In this embodiment, fields in the VRS database 2502 comprise the MRC transaction code 3200, the wand ID 1804, the user ID 1806, firmware ID 3204 (related to its version), driver ID 3206 (related to its driver version), OS type 3208 (e.g., Windows 98®, Windows NT®, Windows 2000®, Apple® OS, etc.), device ID 3210 (which is the unique hard-coded number associated with the particular device), Date-Of-Last-Access field 3212 (which logs the date and time of the last configuration update), and a network address area 3214. Notably, the network address area 3214 contains any number of network address fields related to the various nodes used in the disclosed architecture. For example, the network address area 3214 contains the VWS address 3202 field, perhaps the node address of the user PC 302 in a User field 3216, and one or more auxiliary server address fields VWS$_2$ 3218.

When using the more complex database structure of FIG. 32B, only the unique transaction code 3200 of the MRC 1606 of device or component needs to be transmitted, since all of the additional user and device profile information currently exists in the VRS database 2502. The user and device profile information, having been uploaded to the VRS database 2502 prior to implementation of the new device or software, contains all of the user PC 302 information required to properly identify and locate the respective firmware, device drive, software, or operating mode files on the VWS database 2506. For example, if the user scans the MRC 3130 of the PCI adapter card 3122 of FIG. 31, which MRC 3130 contains the unique transaction code 3200 for a device driver update, the transaction code 3200 is transmitted to the VRS database 2502 where a lookup operation retrieves the necessary user PC 302 information to ultimately download the correct driver. If the user PC 302 were running the Windows 98® OS, this information would be coded in the OS type field 3208 corresponding to the respective transaction code 3200.

The packet sent from the VRS 2500 to the VWS 2504 via the user PC 302 would then contain the transaction code 3200, the OS type information 3208, and the address of the VWS 2504. When received at the VWS 2504, a lookup operation needs to be performed to obtain the correct driver for the user OS, which driver is then downloaded and installed on the user PC 302. As mentioned hereinabove, in some cases the manufacturer has written the software driver to be compatible with all Windows®-based operating systems, in which case the VWS address 3202 will be the URL path to the file location of the driver requested. It can be appreciated that where it is not initially known that the desired device driver is written to be compatible with the existing Microsoft Windows® operating systems, the initial lookup operation will need to be performed, and when a determination is made as to whether the driver is compatible with the three operating systems, the user profile can then be updated with the direct URL path to the file location on the VWS database 2506. This facilitates a follow-up device driver update process of the same adapter 3122 by then foregoing the lookup operation at the VWS 2504.

On the other hand, if the MRC data 1802 as scanned indicates that the device firmware information should be returned regarding a particular device model, then the lookup operation may return a different network address, or could return the same address such that the VWS 2504 contains all of the necessary driver, firmware, and product information in which the user may be interested. As indicated, the VWS address information 3202 may be entered into the VRS database 2502 in the form of domain name format 3206 and/or IP address 3208 format. The source address of the user PC 302 on the network 306 identifies the source location of the user PC 302 such that any information retrieved from the VWS 2504 can be returned back to that unique location on the GCN 306.

Referring again to FIG. 32B, the more complex database containing the user profile information is also applicable to the automatic configuration scenario initiated by simple insertion or connection of the device or component to the user PC 302. For example, the simple insertion of the AGP adapter card 3112 of FIG. 31 triggers automatic configuration of the card 3112. The device ID stored in the ID circuit 3118 is automatically read and assembled into a message packet having the routing information of the VRS 2500 appended thereto. When matched with the respective device ID in the device ID field 3202, the corresponding network address of VWS 2504 is retrieved such that the appropriate files can be retrieved, downloaded, and installed. In one implementation of this embodiment, both the device drivers and firmware are ultimately downloaded to the user PC 302 and adapter card 3112, respectively. In another implementation, the user interacts with the automatic configuration process via a user interface by selecting either the firmware update, or the driver update. The user selection is then encoded into the message packet from the VRS 2500 along with the device ID, and perhaps the OS type, when needed, and the appended VWS 2504 network address. When received at the VWS 2504, the appropriate lookup operation is performed to match the selected user selection with the appropriate configuration information (either firmware or driver). Where the computer peripheral is external, for example, the CD-ROM 3136 of FIG. 31, the same process occurs.

A number of other functions can be triggered from the availability of the additional information contained in this enhanced database, for example, knowing that a user purchased and installed a particular model of graphics adapter can trigger the presentation of selected advertising information to the user relevant to the model of graphics adapter. For example, if the graphics adapter had a model number which cross-referenced to a high end and very expensive adapter used in modeling and simulation and imaging, the user may then be presented with advertising related to high end graphics software packages and/or hardware. Simply knowing a wide variety of hardware information of a user PC 302 can invoke advertising targeted to the user of the PC 302 during operation or even during the process of network surfing. Similarly, if the graphics adapter happened to be one that is closely associated with online gaming, the user may be presented with selective advertising related to a number of network-based games, and releases of the latest related hardware.

Figure 33:
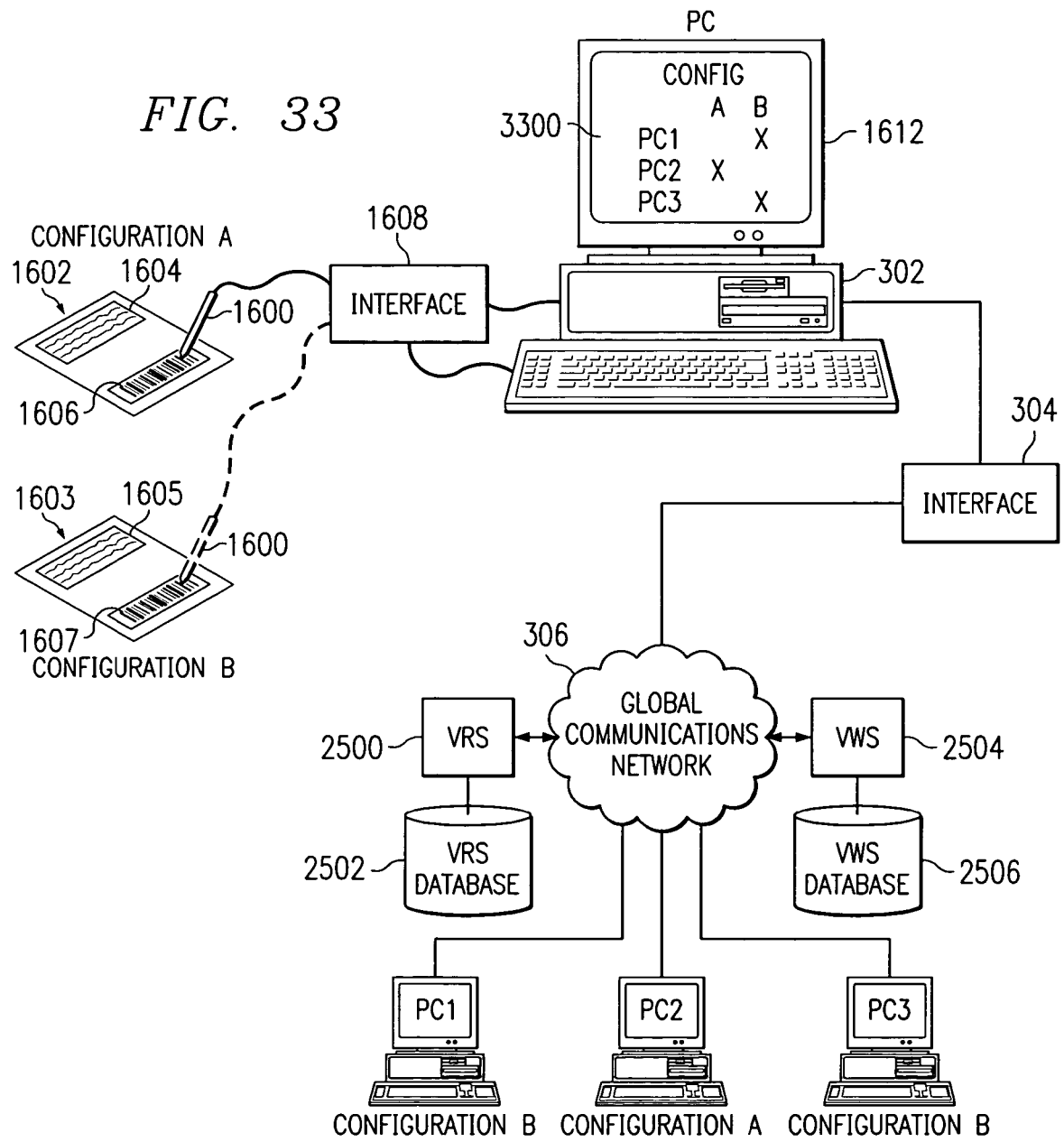
FIG. 33 illustrates an alternative embodiment of FIG. 25 where the user scans an MRC to invoke automatic configuration of one or more computers and associated components into a particular operating mode.

Referring now to FIG. 33, there is illustrated an alternate embodiment of FIG. 25 where the user scans an MRC 1606 to invoke automatic configuration of one or more computers and associated components into an operating mode. Automatic configuration in this illustrated embodiment refers to using the existing hardware and software of the one or more computers without downloading and installing different software in response to scanning of one or more MRCs 1606. In a first scenario, a single computer is automatically configured to an operating mode. Where the single computer PC 302 is reconfigured for presentation of advertising or product information, the user scans the MRC 1606 with the wand 1600 to invoke realtime automatic configuration of one or more components of the PC 302, such that, in response to scanning of the MRC 1606 by the user, the VWS 2504 automatically configures the PC 302 to a predetermined configuration, which configuration process may involve changing the settings in both hardware and software. (It can be appreciated that the automatic configuration process can be programmed to be accomplished at a time substantially later than when the MRC 1606 was scanned, and in response to scanning of the MRC 1606—in essence a scheduled configuration process.)

The user reads the text 1604 and determines, for example, that by scanning the MRC 1606, the desired configuration can be obtained. The transaction code of the MRC 1606 is transmitted, in accordance with previous embodiments, to the VRS 2500 to obtain the associated address of the VWS 2504. When the transaction code is received at the VWS 2504, it then transmits the corresponding system changes back to the PC 302 to, for example, have its multimedia system automatically reconfigured to output high quality sound, change the settings of its video controller to a higher resolution and larger color palette, all in preparation to play and present a brief digital video disk (DVD) audio/video advertising segment (or enhanced product information demonstration) from the VWS 2504 which was linked to the MRC data. As a followup step to completing the DVD segment, the user PC 302 is automatically reconfigured back to its original settings by the VWS 2504.

In a second example, scanning of the MRC 1606 initiates automatic reconfiguration of the entire computer for a particular online gaming purpose. To provide optimum gaming experience, various aspects of the PC 302 need to be reconfigured for optimum play. A particular game may require that for optimum play experience, the video card be set for 1024×768 resolution having a 32-bit color palette, a refresh rate of 85 Hz, joystick settings reconfigured for the selected game, sound card settings for high resolution audio, VoIP (Voice-over-IP) capability for online voice communications with other players, and where a joystick is not used, an alternate keyboard configuration for user control of game features. In lieu of the user having to manually set each of these parameters, the MRC 1606 could be scanned such that the MRC 1606 contains coded data for triggering the automatic reconfiguration of the user PC 302 via the VWS 2504. To facilitate such a reconfiguration, several aspects of the user PC could be known, and stored in a user information file for later retrieval during automatic reconfiguration. This user information could be stored locally as a file on the user PC 302 which is accessed by the VWS 2504 to achieve the desired results, or the file could be stored remotely at the VWS 2504, the VRS 2500, or on an auxiliary server. It can also be appreciated that the scanning process initiates execution of a program local to the user PC 302, which local program reads the user information file and performs the automatic reconfiguration locally, and does not include the VRS 2500 and VWS 2504 in the reconfiguration operation.

In a third scenario, the disclosed architecture provides as a troubleshooting aid to the user the option of automatically configuring the hardware devices or software modules of the PC 302 into a known state. For example, if the user was having video problems, an MRC 1606 which contains one or more codes for automatically reconfiguring the video portion of the computer 302 may be scanned with the wand 1600. The MRC information is then passed through the wedge interface 1608 where routing information is appended thereto, and then into a communication package running on the PC 302 for routing to the intermediate VRS 2500 location. A lookup operation is performed using the MRC information to obtain a match with a network location of the VWS 2504. The MRC information is then assembled into a message packet for transmission to the VWS 2505 where it is decoded and matched to a selected program having configuration information for the particular device which is operating incorrectly on the user PC 302. The selected program then automatically configures the device into a specific mode without user intervention.

Alternatively, the user scans the MRC 1606 and ultimately receives from the VWS 2504 a web page for presentation to the user on the user PC 302, such that the user may now select from various modes in which to operate the faulty device. This feature is beneficial for troubleshooting the faulty device. In a more complex scenario which aligns with the enhanced database structure of FIG. 33, the VWS 2504 returns a user interface (e.g., web page) to the user which provides a variety of options for exercising all or most of the installed components of the user PC 302. Since the enhanced database structure provides additional hardware and software information about the particular user PC 302, the VWS 2504 can now provide a more complex user interface to allow the user to step through a troubleshooting program or to initiate a program which automatically exercises the necessary components in order to ascertain the cause of the problem, and to arrive at a solution.

Not being restricted for use with a single computer 302, the disclosed architecture has application where the scanning process could also initiate automatic reconfiguration of a plurality of networked computers into one or more different modes of operation. Referring again to FIG. 33, there is illustrated a system where the user of user PC 302 can automatically configure a plurality of networked computers ($PC_1$, $PC_2$, and $PC_3$) into one or more configurations (Configuration A and Configuration B). A program running on the user PC 302 provides a user interface 3500 which allows the user to complete a table of selected configurations for the networked computers ($PC_1$, $PC_2$, and $PC_3$). Having the document 1602 which provides the text portion 1604, and the MRC 1606 transaction information enables the implementation of a Configuration A, and a second document 1603 having text portion 1605, and an MRC 1607 for implanting a Configuration B, the user can now group the selected computers via the user interface 3500 to automatically be reconfigured into the desired mode. In this case, the user has designated computers $PC_1$ and $PC_3$ for Configuration B, and $PC_2$ for Configuration A.

In operation, the user makes the designations (for computers $PC_1$ and $PC_3$) for Configuration B in the user interface 3300 of user PC 302, and scans the respective document MRC 1607. The MRC information is transmitted through the wedge interface 1608 where routing information is appended. The software program running on the user PC 302 interfaces with a communication program to route the MRC data and other data (such as the network addresses of those computers which are to be reconfigured, or a pointer to the file having the network address information) to the VRS 2500 where a lookup operation is performed to obtain the network address of the VWS 2504. A second message packet is assembled at the VRS 2500 and transmitted to the VWS 2504 via the user PC 302. The VWS 2504 then retrieves the necessary files and information to reconfigure the designated computers ($PC_1$ and $PC_3$) to Configuration B. Similarly, the user scans the Configuration A MRC 1606 to cause information to be routed from the PC 302 through the VRS 2500 to the VWS 2504 via the user PC 302 where files and information are retrieved to place computer $PC_2$ into Configuration A. Alternatively, the user could scan both of the MRC 1606 and 1607 prior to any transmission from the PC 302. Therefore, the assembled message packet at the PC 302 contains information of both Configurations (A and B) which is then transmitted through the VRS 2500 to the VWS 2504. The VWS 2504 then performs the necessary lookup operations to retrieve the files and information needed to automatically configure all of the networked computers ($PC_1$, $PC_2$, and $PC_3$) in one operation.

Although the various computers may contain components which are different, this information can be known such that one or more files having respective computer component and peripheral listings can be stored for access in accordance with the disclosed embodiments. For example, computer $PC_1$ may have a Brand A video card, and computer $PC_2$ may have a Brand B video card. This device information can be known and stored in files that are accessible such that special program calls and/or drivers can be made available to control the respective devices of the various computers being configured. In this way, each video controller can be automatically reconfigured to output substantially similar video to the respective users by scanning of a single MRC 1606. The encoded MRC information is routed through the VRS 2500 and triggers execution of a program at the VWS 2504 which could then sample the VRS database 2502 (or other network server) for the respective user device files for reconfiguration of the respective computers. Note that the plurality of computers may be disposed on the GCN 306 at various remote locations, or may be disposed on a common LAN such that the VWS 2504 automatically reconfigures all or a portion of the computers on the LAN for a particular environment. In order to select which or perhaps all of the computers are to be reconfigured, the VWS 2504 will display a web page to the user such that the user can then select which users in the database are to be reconfigured for the particular settings, or a program local to the PC 302 communicates with the VWS 2504 to facilitate automatic reconfiguration of the designated computers ($PC_1$, $PC_2$, and $PC_3$).

Note that the disclosed architecture is not restricted to personal computers 302, but is applicable to most network appliances. For example, where a technician is installing a high capacity multi-module router or network hub, the scanning of an MRC associated with a particular module can automatically enable retrieval of the latest device drivers and firmware for the respective module. The scanning process can also retrieve to the technician a web page which provides a number of setup options for either step-by-step troubleshooting of the module, or automatically configuring the module for the intended purpose, such as placing the router in a known state for testing code or particular subnets associated with the router.

The automatic configuration process can also be applied to implementations based upon the purchase of a level of service. For example, it the user of the user PC 302 has prepaid for a first level of service in a service offering of five different levels of service (whether the user owns the PC 302, or rents/leases the PC 302), scanning of the MRC 1606 results in a cross-reference of the particular user ID in a database to retrieve the necessary software code and/or configuration data to configure the user PC 302 to the respective level of prepaid service. The database may be the VWS database 2506, or perhaps the enhanced VRS database 2502, disclosed in accordance with FIG. 32B. This implementation is beneficial where the user may want to install "demo" software on the user PC 302, but lacks sufficient technical knowledge to perform the installation. Scanning of the MRC 1606 related to the demo software initiates automatic download and configuration of the user PC 302 for a prescribed period of time, which is common with many of the existing demo software distributions. As a prelude to full functionality of the software from demo status to full operational status, the user can then pay the purchase price, which in turn triggers automatic configuration of the installed software for full functionality.

As a measure of security to prevent inadvertent download and installation of the wrong configuration information, a number of cross-checks can be made to ensure that the user has requested the correct information for the user PC 302. With the widespread proliferation of PC's 302, it is conceivable that many individuals will not have sufficient knowledge of their hardware and software components. Therefore, in order to provide a more foolproof architecture according to the disclosed embodiments, it is preferable to obtain sufficient information about a user PC 302 to reduce the likelihood that problems will occur. The implementation of the enhanced database of FIG. 33, whether it be hosted on the VRS 2500, the VWS 2504, or an auxiliary server, exemplifies the type of user information required to ensure that the correct and compatible information is downloaded to the user PC 302. For example, where the wand 1600 and/or interface 1608 have been moved to a different location in association with a new user PC 302, a database update process needs to be performed to properly associate the hardware and software components of the new user PC 302 to ensure that the correct configuration parameters are implemented during the automatic configuration process. This can be accomplished by associating the wand 1600 and/or interface 1608 with a software file on the user PC 302 such that replacement of the existing wand 1600 with a different wand 1600 having a different wand ID results in the user being prompted for information which will update the database. Another method is to link the machine configuration file with the node address of the user PC 302 and the unique ID of the network interface card, an ID which is unique in the world.

In more restrictive implementations, the automatic configuration process can be implemented to require user interaction before configuration is allowed. For example, where access to such a user PC 302 is strictly controlled, the update process can be initiated by scanning the MRC 1606, but the update or configuration information is returned to the user PC 302 via an e-mail account, wherein the address of the user e-mail account is stored in the VRS database 2502 in association with the respective user ID. The user is then in more control of when or how the information is installed.

The disclosed architecture is also applicable to an MRC which is magnetic, such as MICR (Magnetic Ink Character Recognition) data in common use with personal checks and drafts, magnetic storage strips such as that used in credit cards, and many forms of bar codes (e.g., UPC, EAN, etc.), and electronic transmission and signaling technologies such as infrared communication from an infrared transmitting device. More specifically, the MRC need not necessarily be a tangible medium, but may be a detectable transmission signal from a device or object on which the automatic configuration is to be performed. As discussed in detail hereinabove, the triggering MRC can be an audio signal that is received by the user PC 302, decoded to obtain the relevant model and firmware or driver information, and transmitted to the VRS 2500 and VWS 2505 to obtain the same results.

Automatic Configuration of Non-Personal Computer Equipment

Referring now to FIG. 34, there is illustrated an alternate embodiment wherein a piece of equipment is automatically configured in accordance with a scanned transaction code. In this second category, the architecture is applied to non-computer-related equipment, for example, test equipment, network equipment, and scientific instruments. Operation of the system of FIG. 34 is substantially similar to the operation of FIG. 25, with the distinction that a piece of equipment 3400 is connected to the GCN 306. The equipment 3400 has access to, and therefore is accessible by, one or more nodes on the GCN 306. This is facilitated by an interface 3402 which is an external communication interface used in conjunction with the equipment 3400 or is an integral part of the equipment 3400 to provide an accessible node on the GCN 306.

In a first embodiment, the user scans the MRC 1606 which is placed on a document 1602 having readable text 1604, with the wand 1600. The MRC 1606 contains a transaction code which uniquely identifies a particular type of configuration the user wants installed on the equipment 3400. For example, if the MRC 1606 contains a transaction code which indicates that a firmware update is desired for the particular piece of equipment 3400, scanning of the MRC 1606 results in a firmware update operation being performed on the equipment 3400. A second bar code 1611 may uniquely identify a type of configuration relating to a level of service that the user has contracted with the vendor of the equipment 3400 to provide. Similarly, the MRC 1611 may uniquely identify a transaction related to downloading and installing driver information for the equipment 3400, or for implementation of a particular operating mode. Therefore, the document may contain a single MRC 1606 or a plurality of MRCs 1606 (and 1611) which indicate a variety of features or configurations that the user may want installed on the equipment 3400.

In a second embodiment similar in fashion to an embodiment mentioned hereinabove, the product (equipment 3400, in this embodiment) may also comprise or have attached thereto one or more of the MRCs 1606. For example, the equipment 3400 may have attached thereto an MRC 3406 (similar to MRC 1606) containing transaction code information which is scanable by the wand 1600 to initiate the update process associated with MRC 1606. Additionally, the equipment 3400 may have attached thereto a second MRC 3408 which contains a transaction code which uniquely identifies automatic configuration related to downloading the latest driver software, or a particular level of service which the user has contracted with the vendor to provide. In any case, there is provided one or more MRCs 3406 having respective transaction codes to uniquely identify the particular configuration which the user desires performed on the equipment 3400.

It can be appreciated that the equipment 3400 may be located in the same location and proximate to the user PC 302 such that a connection 3410 (e.g., a peripheral communication link) exists between the PC 302 and the equipment 3400 for monitor and control, or perhaps ultimately to provide the configuration information through the PC 302 to the equipment 3400. (Notably, the peripheral communication port may be, for example, a USB link, IEEE 1394 link, IEEE 488 link, RS-232, etc.) Similarly, although located proximate to the user PC 302, the equipment 3400 may be automatically configured by downloading the configuration information directly into the equipment 3400 from across the GCN 306, instead of through the user PC 302.

Alternatively, the equipment 3400 may be located remotely from the location of the user PC 302 such that automatic configuration occurs in response to the user scanning the MRC 1606, but remotely from the PC 302 across the GCN 306 to the equipment 3400. Therefore, in a first scenario, the user scans the MRC 1606 with the wand 1600 which transaction information is passed into the interface 1608 where routing information regarding the VRS 2500 is appended to the transaction information. When received by the user PC 302, the transaction/routing information is assembled into a data packet with other information and transmitted across the GCN 306 to the VRS 2500 where a lookup operation is performed using the transaction code to obtain the network address of the VWS 2504. In response to the particular transaction code of MRC 1606, the respective transaction information is retrieved from the VWS database 2506 after a lookup operation is performed, and returned across the GCN 306 to the PC 302. The PC 302 may then pass the configuration information across either of two paths, back across the GCN 306 to the equipment 3400 or through the connection 3410 to the equipment 3400 for configuration according to the retrieved configuration information.

In a second scenario, the user scans the MRC 1606 having the embedded transaction code with the wand 1600, which information is passed into the interface 1608 to append routing information thereto. When received into the PC 302, the transaction code/routing information is assembled into a data packet and transmitted through the interface 304 across the GCN 306 to the VRS 2500 where a lookup operation is performed on a VRS database 2502 according to the transaction code to obtain the network address of the VWS 2504. The VWS 2504 retrieves the configuration information according to the particular transaction code received, and downloads the configuration information directly to the equipment 3400 across the GCN 306. The equipment 3400 is then automatically configured according to the information received from the VWS 2504.

In a third scenario, the equipment 3400 is uniquely associated with the purchaser of the equipment 3400 when received from the vendor. If the vendor has already subscribed to the VRS system architecture, the profile information of the user already exists in association with the particular piece of equipment 3400 such that the profile information is downloaded to the VRS 2500 for later use in the automatic configuration process. In this embodiment, the enhanced database structure of FIG. 32B is used. The user then receives the newly purchased piece of equipment 3400 and connects it to the GCN 306, which connection automatically initiates the update process to retrieve from the VWS 2504 the vendor who sold the equipment 3400 to the user, the updated information pertinent to operation of the equipment 3400. In this particular scenario, the user is not required to scan an MRC 3406 or 1606 to initiate an update process, but may be prompted by, for example, front panel indicators or a user interface to initiate such update process.

Figure 35:
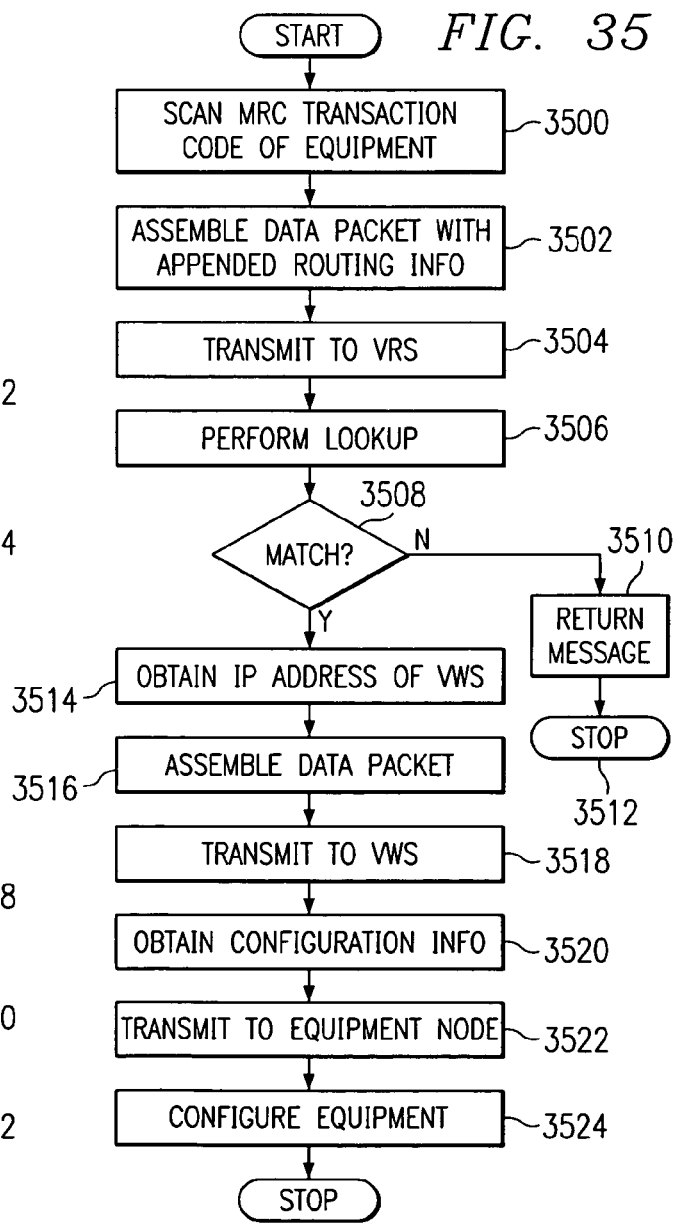
FIG. 35 illustrates a flowchart of the operation of the system of FIG. 34.

Referring now to FIG. 35, there is illustrated a flowchart of the equipment configuration process. Flow starts at a Start block and moves to a function block 3500 where the user scans the MRC 1606 associated with the piece of equipment 3400. Flow is then to a function block 3502 where a data packet is assembled with the appended routing information which is the network address of the VRS 2500, along with the transaction code of the MRC 1606. Flow is then to a function block 3504 where this data packet is transmitted to the VRS 2500. A lookup operation is then performed at the VRS 2500 using the VRS database 2502 to obtain the network address of the VWS 2504 associated with the transaction code, as indicated in a function block 3506. Flow is then to a decision block 3508 where a matching operation is performed using the transaction code and/or one or more other bits of data information contained in the data packet. If a match does not occur, flow is out the "N" path to a function block 3510 where a message is returned to the user indicating that a match has not occurred. Flow is then to a stopping point 3512.

On the other hand, if the match has occurred, flow is out the "Y" path to a function block 3514 where the network address of the VWS 2504 is obtained. Flow is then to a function block 3516 where a second data packet is assembled comprising the transaction code, network address of the equipment location, and the network address of the VWS 2504, contained therein. The assembled data packet is then transmitted to the VWS 2504 via the user PC 302, as indicated in the function block 3518. Flow is then to a function block 3520 where the configuration information is obtained during a lookup operation from the VWS database 2506. Flow is then to a function block 3522 where the configuration information is then transmitted from the VWS 2504 to the equipment node, meaning that the equipment 3400 may be located at the same location as the user PC 302 or at a node on the network which is remote from the user PC 302. Flow is then to a function block 3524 where the equipment 3400 is configured according to the retrieved configuration information. Flow is then to a Stop block.

Referring now to FIG. 36, there is illustrated a sample basic database structure for the equipment configuration embodiment. The VRS database 2502 contains a transaction code 3600, a device address 3602, and a VWS address 3604. When the user scans the MRC 3406 containing the encoded transaction code 3600, a lookup operation is performed on the VRS database 2502 to retrieve the VWS network address 3604. A message packet is then assembled with the device address 3602 and VWS address 3604 to ultimately execute the configuration file for the particular transaction code 3600. The configuration file can then be transmitted to the piece of equipment 3400 in accordance with the device address 3602, or in more robust implementations, be executed by the VWS 2504 to provide control by the VWS 2504 over the configuration process of the piece of equipment 3400. In any case, a user interface may be provided to allow the user to interact with the configuration process, or the process can be performed automatically without user interaction after the scanning process. As mentioned hereinabove, the VRS database 2502 is populated with the transaction code 3600, device address 3602, and VWS address 3604 information at the time the user obtains the piece of equipment 3400. As the piece of equipment changes network locations, the VRS database 2502 will need to be updated to facilitate the automatic configuration process. In an alternative implementation, where the VWS address 3604 in the VRS database 2502 does not point directly to the desired configuration file location, more information must be transmitted to the VWS 2504 to undergo one or more lookup operations in order to locate the desired configuration file.

Referring now to FIG. 37, there is illustrated a sample enhanced database structure of the VRS database according to automatic configuration of a piece of test equipment 3400. The VRS database 2502 has stored therein a user profile which contains a table of linked fields. For example, each transaction code 3700 is uniquely linked to a select one of the configuration modes 3702. (Note that the configuration code fields are not necessary in the VRS database 2502 for operation of the system, in that the particular transaction code 3700 is linked with a VWS address field 3708, which VWS address field defines the configuration mode of the transaction. Furthermore, each transaction code 3700 linked to a specific device ID 3704 (of a piece of equipment 3400) which is associated with a user (via a user ID 3706). Therefore, only that user is allowed to enable a configuration mode. It can be appreciated that a number of different users can be linked with a single device ID 3704 such that more than one user can invoke automatic configuration of the piece of equipment 3400 associated with the single device ID 3704.

The transaction code 3700 can also be a generic code such that two different pieces of equipment 3400 can have the identical MRC 3406 (with the same underlying transaction code) attached thereto or associated therewith, but that when the message packet is assembled and transmitted to the VRS 2500 from the user PC 302, the device ID may also be transmitted to facilitate matching of the transaction code with the appropriate piece of equipment 3400. For example, a user may have two pieces of equipment (designated Device1 and Device2) each having the same generic MRC 3406 (indicating a firmware update) attached thereto. However, to discern the same transaction codes in the VRS database 2502, another data packet of information needs to be sent, namely the associated device IDs (Device1 or Device2). A lookup operation utilizing both the transaction code and the device ID 3704 then connects to the proper file location on the VWS 2504 to retrieve and install the proper configuration file.

Note that although the previous discussions have disclosed a network communication environment where the message packets are routed from the user PC 302 to the VRS 2500, and then from the VRS 2500 to the VWS 2504, the routing of information can also occur in accordance with the architecture of FIG. 3. Therefore, message routing initiates from the user PC 302 to the VRS 2500, and then from the VRS 2500 back to the user PC 302, and then on to the VWS 2504 to retrieve the appropriate configuration file.

In summary, there is provided a computer or computer peripherals, and/or non-computer-related equipment each having one or more machine-resolvable codes associated therewith. A user reads one of the machine-resolvable codes with a reader. In response, a transaction code contained therein, and associated with a type of configuration information, is assembled into a message packet having routing information appended thereto. The appended routing information is the network address of an intermediate vendor reference server 2500 having a database 2502 which cross-references the transaction information with a network address of the associated configuration information. The network address of the configuration information is obtained, and connection is made to that location to retrieve the configuration information to the computer or computer peripheral, and/or non-computer-related equipment for installation.

Although the preferred embodiment has been described in detail, it should be understood that various changes, substitutions and alterations can be made therein without departing from the spirit and scope of the invention as defined by the appended claims.

What is claimed is:

1. A method of configuring a piece of equipment, comprising the steps of:
    providing the piece of equipment in communication with a network, the piece of equipment having one or more machine-resolvable codes associated therewith;
    connecting the piece of equipment to a remote location disposed on the network in response to a select one of the one or more machine-resolvable codes being read with a reader;
    transmitting configuration information associated with the select one of the one or more machine-resolvable codes from the remote location to the piece of equipment; and
    configuring the piece of equipment according to the configuration information.

2. The method of claim 1, wherein the one or more machine-resolvable codes in the step of providing contain transaction information which indicates the type of configuration information with which to configure the piece of equipment.

3. The method of claim 2, wherein the transaction information indicates a software update.

4. The method of claim 3, wherein the software update is equipment driver software.

5. The method of claim 2, wherein the transaction information is associated with operating mode information which places the piece of equipment in a select one of one or more operating modes.

6. The method of claim 5, wherein the select one of one or more operating modes is determined by a subscribed level of support from a vendor of the piece of equipment.

7. The method of claim 1, wherein the one or more machine-resolvable codes in the step of providing are on the piece of equipment.

8. The method of claim 1, wherein the one or more machine-resolvable codes in the step of providing are separate from the piece of equipment.

9. The method of claim 1, wherein the step of connecting first connects to an intermediate location on the network to obtain a network address of the remote location on the network, after which the intermediate location connects to the remote location to facilitate retrieval of the configuration information to the piece of equipment.

10. The method of claim 9, wherein a lookup operation is preformed at the intermediate location based upon a transaction code contained in the select one of the one or more machine-resolvable codes to obtain the network address of the remote location.

11. The method of claim 1, wherein the step of configuring is performed automatically without user intervention.

12. The method of claim 1, wherein a user interacts with a user interface during the step of configuring to control the step of configuring of the piece of equipment.

13. The method of claim 12, wherein the user interface comprises user interaction with front-panel hardware of the piece of equipment.

14. The method of claim 1, wherein the reader in the step of connecting connects to a computer disposed on the network, and the piece of equipment connects to the computer via a peripheral communication port of the computer such that in response to the select one of the one or more machine-resolvable codes being read, the configuration information is sent through the computer in step of transmitting to the piece of equipment via the peripheral communication port.

15. The method of claim 1, wherein the reader in the step of connecting connects to a computer disposed on the network at a source location, such that in response to the select one of the one or more machine-resolvable codes being read, the configuration information is transmitted to the piece of equipment, which piece of equipment is also located at the source location proximately to the computer.

16. The method of claim 1, wherein the network is global communication network.

17. The method of claim 1, wherein the one or more machine-resolvable codes in the step of providing are in the form of a bar code.

18. The method of claim 1, wherein the one or more machine-resolvable codes in the step of providing are in the form of a magnetic strip.

19. An architecture for configuring a piece of equipment, comprising:
    a network having the piece of equipment interfaced thereto, the piece of equipment having one or more machine-resolvable codes associated therewith;
    a remote location disposed on said network which connects to the piece of equipment in response to a select one of said one or more machine-resolvable codes being read with a reader; and
    configuration information associated with said select one of said one or more machine-resolvable codes which is transmitted from said remote location to the piece of equipment;
    wherein the piece of equipment is configured according to said configuration information.

20. The architecture of claim 19, wherein said one or more machine-resolvable codes contain transaction information which indicates a type of said configuration information with which to configure the piece of equipment.

* * * * *